(12) United States Patent
Hoshino et al.

(10) Patent No.: US 9,711,766 B2
(45) Date of Patent: Jul. 18, 2017

(54) ENERGY STORAGE APPARATUS

(71) Applicants: GS Yuasa International, Ltd., Kyoto-shi, Kyoto (JP); Honda Motor Co., Ltd., Tokyo (JP)

(72) Inventors: Motoki Hoshino, Kyoto (JP); Yosuke Nishimura, Kyoto (JP); Masao Kawata, Saitama (JP)

(73) Assignees: GS YUASA INTERNATIONAL LTD., Kyoto (JP); HONDA MOTOR CO., LTD., Tokyo (JP)

( * ) Notice: Subject to any disclaimer, the term of this patent is extended or adjusted under 35 U.S.C. 154(b) by 49 days.

(21) Appl. No.: 14/952,401

(22) Filed: Nov. 25, 2015

(65) Prior Publication Data

US 2016/0156006 A1    Jun. 2, 2016

(30) Foreign Application Priority Data

Nov. 27, 2014 (JP) .................. 2014-240388
Nov. 20, 2015 (JP) .................. 2015-227794

(51) Int. Cl.

| H01M 2/10 | (2006.01) |
|---|---|
| H01M 2/14 | (2006.01) |
| H01M 10/625 | (2014.01) |
| H01M 10/613 | (2014.01) |
| H01M 10/6556 | (2014.01) |

(52) U.S. Cl.
CPC ....... *H01M 2/1077* (2013.01); *H01M 10/613* (2015.04); *H01M 10/625* (2015.04); *H01M 10/6556* (2015.04); *H01M 2220/20* (2013.01)

(58) Field of Classification Search
CPC .......... H01M 2/1077; H01M 10/6556; H01M 10/625; H01M 10/613; H01M 2220/20
See application file for complete search history.

(56) References Cited

U.S. PATENT DOCUMENTS

2011/0262799 A1   10/2011   Kim
2016/0149180 A1*   5/2016   Tokoo ................. H01M 2/1077
                                                                429/120

FOREIGN PATENT DOCUMENTS

| JP | 2009-081056 A | 4/2009 |
|---|---|---|
| JP | 2010-257652 A | 11/2010 |
| JP | 2010-287550 A | 12/2010 |
| JP | 2011-228272 A | 11/2011 |
| JP | 2012-256465 A | 12/2012 |
| WO | WO-2012/133709 A1 | 10/2012 |

* cited by examiner

*Primary Examiner* — Stewart Fraser
(74) *Attorney, Agent, or Firm* — Michael Best & Friedrich LLP

(57) ABSTRACT

An energy storage apparatus includes a base arranged adjacently to an energy storage device and forming a passage between the base and the energy storage device, a holder that holds the energy storage device and a spacer, and an insulator arranged between the spacer and the holder. The insulator includes a first insulating portion arranged between the spacer and the holder, and a first sealing portion being in contact with an extending portion.

13 Claims, 12 Drawing Sheets

ENERGY STORAGE APPARATUS

CROSS-REFERENCE TO RELATED APPLICATIONS

This application claims the benefit of Japanese patent applications No. 2014-240388 filed on Nov. 27, 2014, and No.2015-227794 filed on Nov. 20, 2015, which are incorporated by reference.

FIELD

The present invention relates to an energy storage apparatus that includes an energy storage device.

BACKGROUND

Since an electric vehicle or a hybrid electric vehicle requires a power source having large capacity, a battery block including a plurality of battery cells is used in such a vehicle.

The battery module of this type includes a plurality of battery cells arranged in a first direction, a plurality of separators each inserted between the adjacent battery cells, a pair of end plates that sandwich the plurality of battery cells and the plurality of separators in the first direction therebetween, and a bind bar that is fixed to each of the pair of end plates and is in contact with each of the plurality of separators.

Each of the plurality of separators forms an air supply gap through which a cooling gas flows between the adjacent battery cells. Therefore, the battery block is configured to be capable of cooling each of the plurality of battery cells by a cooling fluid that is supplied to a periphery of the battery block and passes through each air supply gap (see JP-A-2010-287550, for example).

In the above-described battery block, a gap is occasionally generated between the bind bar and the separator by deflection of the bind bar, for example, at the time of assembling or at the time of use. In such a case, a portion of the cooling fluid supplied to the periphery of the battery block passes through the gap between the separator and the bind bar. Accordingly, in the battery block, a flow rate of the cooling fluid entering each air supply gap decreases, and cooling performance of the plurality of the battery cells occasionally reduces.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus capable of suppressing loss of a cooling fluid flowing through a passage.

An energy storage apparatus according to an aspect of the present invention includes an energy storage device, a spacer arranged adjacently to the energy storage device in a first direction, a holder that holds the energy storage device and the spacer, and an insulator arranged between the spacer and the holder, wherein the spacer includes a base that forms a passage in a second direction orthogonal to the first direction between the base and the energy storage device adjacent in the first direction, and an extending portion extending from the base in the first direction, and the insulator includes a first insulating portion arranged between the extending portion of the spacer and the holder, and a first sealing portion being in contact with the extending portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
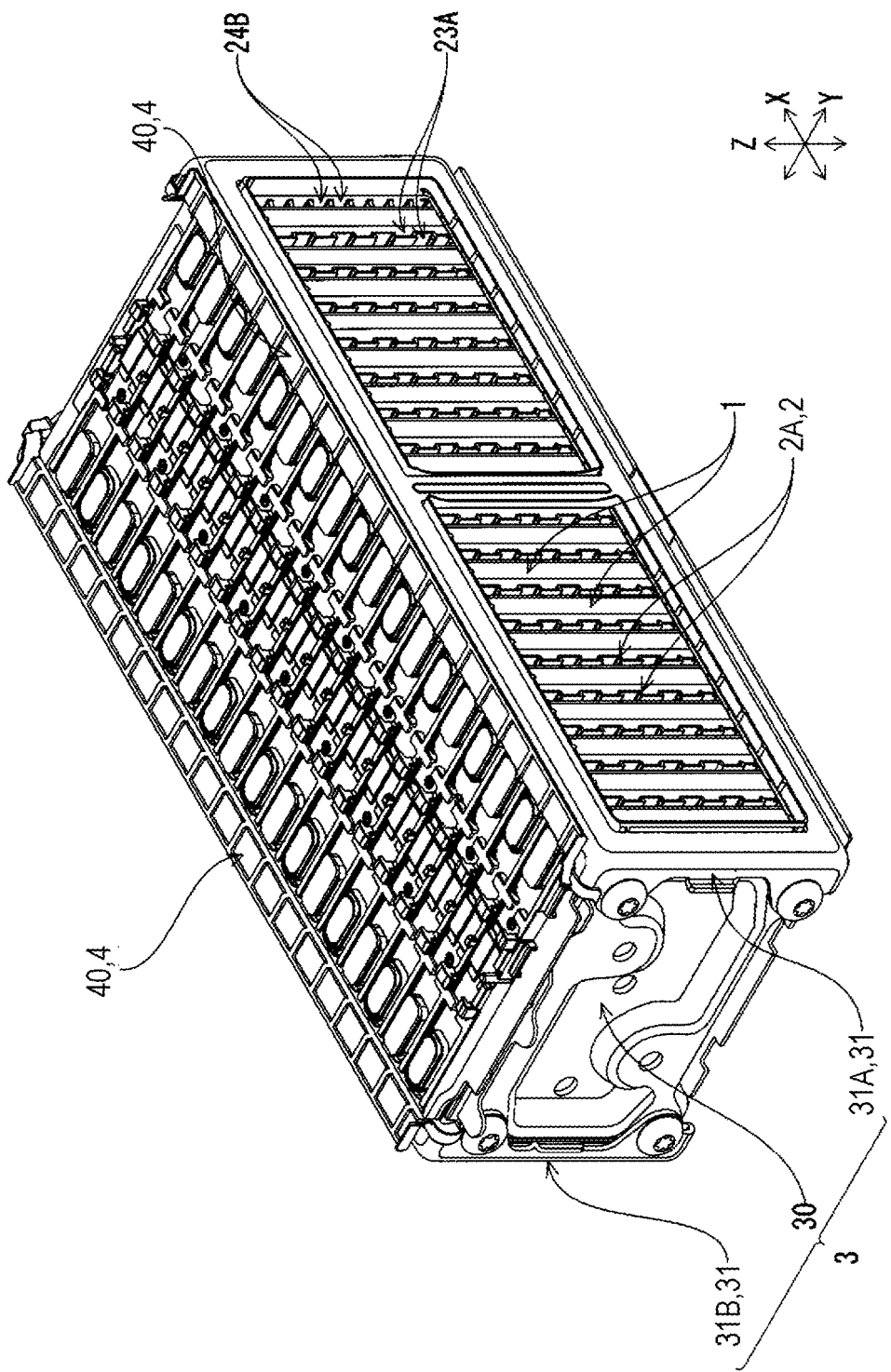
FIG. 1 is a perspective view of an energy storage apparatus according to one embodiment of the present invention.

An energy storage apparatus according to an aspect of the present invention includes an energy storage device, a spacer arranged adjacently to the energy storage device in a first direction, a holder that holds the energy storage device and the spacer, and an insulator arranged between the spacer and the holder, wherein the spacer includes a base that forms a passage in a second direction orthogonal to the first direction between the base and the energy storage device adjacent in the first direction, and an extending portion extending from the base in the first direction, and the insulator includes a first insulating portion arranged between the extending portion of the spacer and the holder, and a first sealing portion being in contact with the extending portion.

According to such a configuration, the first insulating portion of the insulator is in contact with the holder, and the first sealing portion continuous with the first insulating portion is in contact with the extending portion of the spacer (the first insulating portion abuts against the holder). Accordingly, the battery storage apparatus can block a cooling fluid that tends to flow into between the holder and the extending portion of the spacer, by the first insulating portion of the insulator and the first sealing portion of the insulator.

Therefore, the energy storage apparatus can lead the fluid that tends to flow into between the holder and the extending portion of the spacer to flow through each passage. In this manner, the energy storage apparatus can suppress loss of the cooling fluid flowing through the passage.

In this case, the extending portion may include a surface to be contacted that is in contact with the first sealing portion, and the first sealing portion may extend from the first insulating portion in a direction inclined with respect to the surface to be contacted.

Also in this manner, the first insulating portion of the insulator is in contact with the holder, and the first sealing portion continuous with the first insulating portion is in contact with the extending portion of the spacer. Accordingly, the battery storage apparatus can block the cooling fluid that tends to flow into between the holder and the extending portion of the spacer, by the first insulating portion of the insulator and the first sealing portion of the insulator.

Therefore, the energy storage apparatus can lead the fluid that tends to flow into between the holder and the extending portion of the spacer to flow through each passage. In this manner, the energy storage apparatus can suppress loss of the cooling fluid flowing through the passage.

In this case, the first sealing portion may have elasticity and lower rigidity than that of the surface to be contacted.

In this manner, the first sealing portion is elastically deformed by being in contact with the surface to be contacted of the extending portion. As a result, an elastic force is generated in the first sealing portion. Therefore, it becomes difficult for the first sealing portion to separate from the surface to be contacted. As a result, the energy storage apparatus can more securely block the fluid that tends to flow into between the holder and the extending portion of the spacer.

According to an aspect of the present invention, the first sealing portion of the insulator may extend in the second direction and be in contact with the surface to be contacted, and the surface to be contacted may be inclined with respect to a direction in which the first sealing portion extends.

In this manner, the first sealing portion that extends in the direction inclined with respect to the surface to be contacted can be in contact with the surface to be contacted, and the first sealing portion can be elastically deformed. Accordingly, the energy storage apparatus can make it difficult for the first sealing portion to separate from the surface to be contacted by the generation of an elastic force in the first sealing portion. Therefore, the energy storage apparatus can more securely block the fluid that tends to flow into between the holder and the extending portion of the spacer.

According to an aspect of the present invention, the extending portion may extend from each of opposite ends in a third direction orthogonal to each of the first direction and the second direction of the base, the insulator may include a pair of the first sealing portions, the one of the first sealing portions may be in contact with the extending portion formed on the one end in the third direction of the base, and the other first sealing portion may be in contact with the extending portion formed on the other end in the third direction of the base.

In this manner, the energy storage device can block the fluid that tends to flow into between the extending portion at each of the opposite ends in the third direction of the base and the holder, by the first insulating portion and the first sealing portion. That is, the energy storage apparatus can block the fluid that tends to flow into between the holder and the spacer, at the opposite ends in the third direction by the first insulating portion and the first sealing portion.

Therefore, the energy storage apparatus can lead the fluid that tends to flow into between the extending portion at each of the opposite ends in the third direction of the base and the holder to flow through each passage. In this manner, the energy storage apparatus can suppress loss of the cooling fluid flowing through the passage.

According to an aspect of the present invention, the first sealing portion of the insulator may extend in a direction inclined with respect to the second direction and be in contact with the surface to be contacted, and the surface to be contacted may extend in the first direction and in the third direction orthogonal to each of the first direction and the second direction.

Also in this manner, the first sealing portion that extends in the direction inclined with respect to the surface to be contacted can be in contact with the surface to be contacted, and the first sealing portion can be elastically deformed. Accordingly, the energy storage apparatus can make it difficult for the first sealing portion to separate from the surface to be contacted by the generation of an elastic force in the first sealing portion. Therefore, the energy storage apparatus can more securely block the fluid that tends to flow into between the holder and the extending portion of the spacer.

According to an aspect of the present invention, the energy storage apparatus may include a plurality of energy storage devices arranged in a row in the first direction, and a plurality of the spacers arranged adjacently to the plurality of energy storage devices, wherein each of the plurality of the spacers may include a base that forms a passage between the base and each energy storage device adjacent in the first direction, and the extending portion extending from the base in the first direction, and the first sealing portion may be a projecting ridge that is in contact with the extending portion.

In this manner, the energy storage apparatus can block the cooling fluid that tends to flow into between the holder and the extending portion of each of the plurality of spacers, by the extending portion of each of the plurality of spacers and the first sealing portion.

Accordingly, the energy storage apparatus can lead the fluid that tends to flow into between the holder and the extending portion of each of the plurality of spacers to flow through each passage. Therefore, the energy storage apparatus can suppress loss of the cooling fluid flowing through the passage.

In this case, among the plurality of spacers, the spacer arranged at an end portion in the first direction may include a connecting side that connects a pair of extending portions extending respectively from the opposite ends in the third direction orthogonal to each of the first direction and the second direction of the base, the insulator may include a second insulating portion arranged between the holder and the connecting side of the spacer arranged at the end portion, and a second sealing portion continuous with the second insulating portion and being in contact with the connecting side of the spacer arranged at the end portion, and the second sealing portion may be continuous with the first sealing portion.

In this manner, the energy storage apparatus can block the fluid that tends to flow into between the connecting side of the spacer arranged at the end portion in the first direction and the holder, by the second insulating portion and the second sealing portion. That is, the energy storage apparatus can block the fluid that tends to flow into between the holder and the spacer, also at opposite ends in the first direction by the second insulating portion and the second sealing portion.

Therefore, the energy storage apparatus can lead the fluid that tends to flow into between the holder and each of the extending portions of the plurality of spacers, and also the fluid that tends to flow into between the connecting side of the spacer arranged at each of the opposite ends and the holder to flow through each passage. In this manner, the energy storage apparatus can further suppress loss of the cooling fluid flowing through the passage.

In this case, the holder may include a frame having a long side in the first direction, the frame may include a connecting portion arranged adjacently to each of the extending portions of the plurality of spacers with the first sealing portion of the insulator interposed therebetween, and the connecting portion of the frame may be bent so as to have a center portion in the first direction that projects toward the insulator.

In this manner, a center portion in the first direction of the insulator is firmly sandwiched between the center portion in the first direction of the connecting portion and the extending portion of the spacer.

That is, a center portion in the first direction of the first insulating portion of the insulator is more strongly pressed to the connecting portion of the frame, and a center portion in the first direction of the first sealing portion is more strongly pressed to the extending portion of the spacer.

Accordingly, the energy storage apparatus can more securely prevent separation of the first insulating portion from the connecting portion of the frame due to deflection of the connecting portion of the frame, or separation of the first sealing portion from the surface to be contacted of the extending portion due to deflection of the connecting portion of the frame.

As a result, the energy storage apparatus can more securely block the fluid that tends to flow into between the holder and each of the extending portions of the plurality of spacers, by the first insulating portion of the insulator and the first sealing portion of the insulator. Therefore, the energy storage apparatus can more securely suppress loss of the cooling fluid flowing through the passage.

According to an aspect of the present invention, the surface to be contacted of the extending portion may include a first surface to be contacted, and a second surface to be contacted arranged adjacently to the first surface to be contacted in the third direction, and the first sealing portion may include a sealing portion being in contact with the first surface to be contacted, and a sealing portion being in contact with the second surface to be contacted.

In this manner, the cooling fluid that tends to flow into between the holder and the extending portion of the spacer can be blocked by a portion where the first surface to be contacted and the sealing portion are in contact with each other and a portion where the second surface to be contacted and the sealing portion are in contact with each other. Accordingly, the energy storage apparatus can more securely block the fluid that tends to flow into between the holder and the extending portion of the spacer. Therefore, the energy storage apparatus can more securely suppress loss of the cooling fluid flowing through the passage.

In this case, the first surface to be contacted may be arranged at a position where the first surface to be contacted is closer to the passage than the second surface to be contacted is, and the sealing portion being in contact with the first surface to be contacted may have a larger projecting length than that of the sealing portion being in contact with the second surface to be contacted.

In this manner, it becomes easy for the sealing portion to be in close contact with the first surface to be contacted arranged at the position where the first surface to be contacted is closer to the passage than the second surface to be contacted is. Accordingly, the energy storage apparatus can securely block the fluid that tends to flow into between the holder and the extending portion of the spacer, and more securely suppress loss of the cooling fluid flowing through the passage.

An energy storage apparatus according to another aspect of the present invention includes an energy storage device, a spacer arranged adjacently to the energy storage device in a first direction, a holder that holds the energy storage device and the spacer, and an insulator arranged between the spacer and the holder, wherein the spacer includes a base that forms a passage in a second direction orthogonal to the first direction between the base and the energy storage device adjacent in the first direction, and a pair of extending portions extending from the base in the first direction, and extending respectively from opposite ends in a third direction orthogonal to each of the first direction and the second direction, and a connecting side connecting the pair of extending portions, wherein the insulator includes an insulating portion arranged between the holder and the connecting side of the spacer, and a sealing portion being in contact with the connecting side.

According to such a configuration, the insulating portion of the insulator is in contact with the holder, and the sealing portion continuous with the insulating portion is in contact with a connecting side of the spacer. Accordingly, the energy storage apparatus can block the cooling fluid that tends to flow into between the holder and the connecting side of the spacer, by the insulating portion of the insulator and the sealing portion of the insulator.

Therefore, the energy storage apparatus can lead the fluid that tends to flow into between the holder and the connecting side of the spacer to flow through each passage. In this manner, the energy storage apparatus can suppress loss of the cooling fluid flowing through the passage.

As described above, according to an aspect of the present invention, an energy storage apparatus capable of suppressing loss of a cooling fluid flowing through a passage can be provided.

Hereinafter, one embodiment of an energy storage apparatus according to an aspect of the present invention is described with reference to the drawings. Names of constitutional members in the embodiment are used only for the embodiment, and may differ from names of constitutional members in the background.

As shown in FIG. 1, the energy storage apparatus includes an energy storage device 1, a spacer 2 arranged adjacently to the energy storage device 1, and a holder 3 that collectively holds the energy storage device 1 and the spacer 2. The holder 3 is formed by molding using an electrically conductive material. Correspondingly, the energy storage apparatus includes an insulator 4 arranged between the energy storage device 1 and the holder 3.

Figure 3:
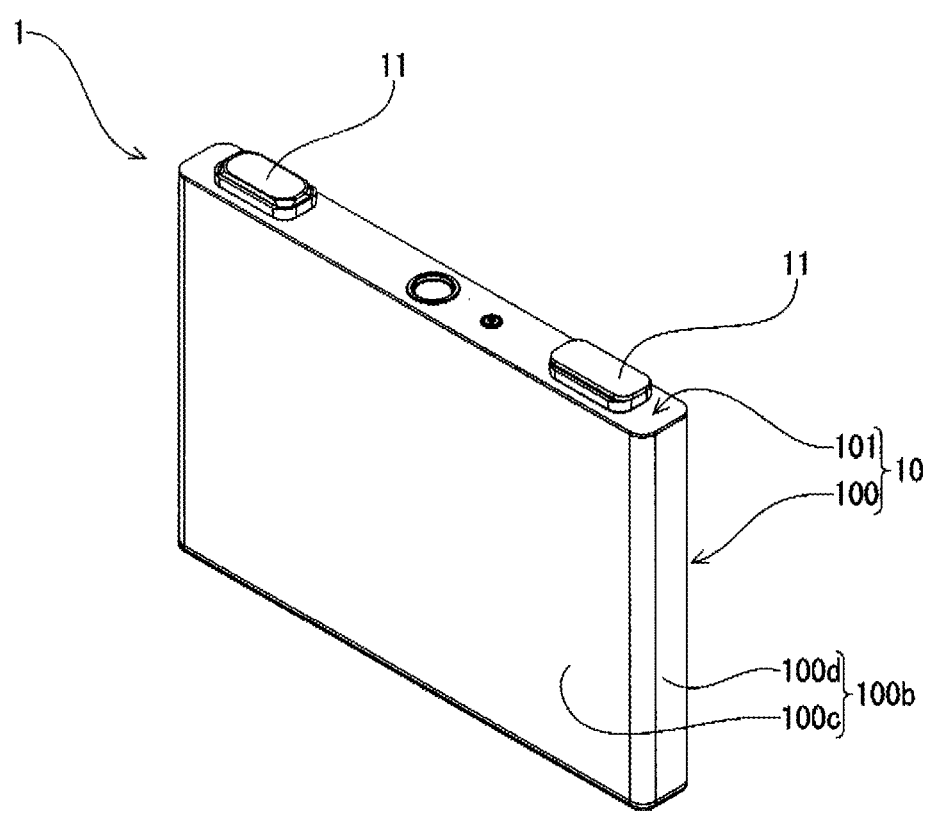
FIG. 3 is a perspective view of an energy storage device in the energy storage apparatus.
Figure 4:
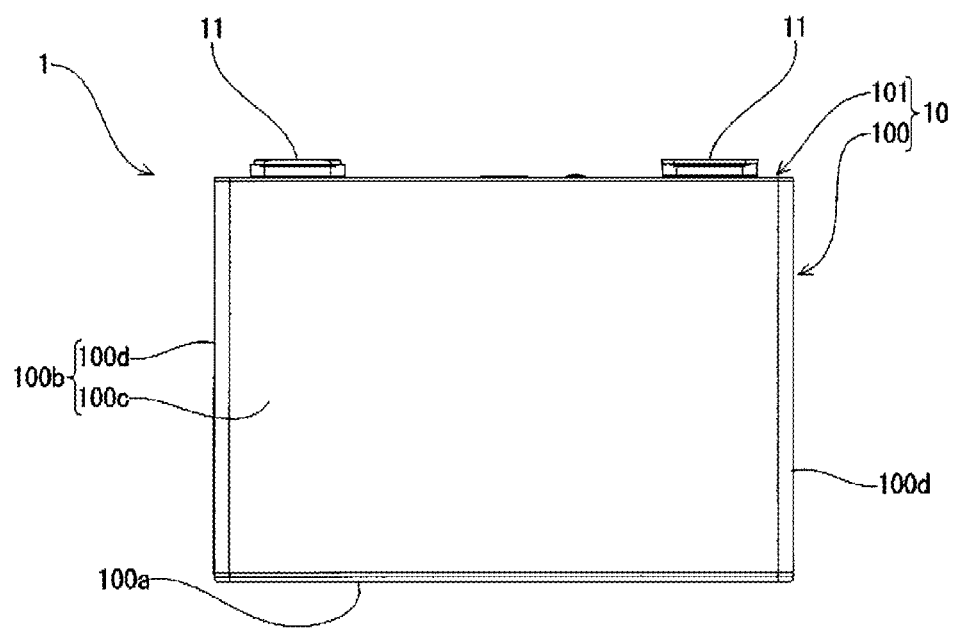
FIG. 4 is a front view of the energy storage device in the energy storage apparatus.
Figure 4:
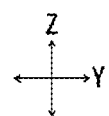

As shown in FIG. 3 and FIG. 4, the energy storage device 1 includes an electrode assembly that includes a positive electrode and a negative electrode, a case 10 that houses the electrode assembly, and a pair of external terminals 11 arranged on an outer surface of the case 10.

The case 10 includes a case body 100 having an opening, and a lid plate 101 that closes the opening of the case body 100 and has an outer surface on which the pair of external terminals 11 are arranged.

The case body 100 includes a closing portion 100a (see FIG. 4), and a cylindrical barrel portion 100b that is connected to a periphery of the closing portion 100a so as to surround the closing portion 100a.

The barrel portion 100b includes a pair of first walls 100c that are spaced apart from each other and face each other, and a pair of second walls 100d that face each other with the pair of first walls 100c interposed therebetween.

Each of the first walls 100c and the second walls 100d is formed in a rectangular shape. That is, a surface of each of the first walls 100c and the second walls 100d is a flat surface and includes a quadrangular region. Each first wall 100c and each second wall 100d are arranged adjacently to each other in a state where end edges of the first and second walls 100c and 100d abut each other. Correspondingly, the end edges of the first wall 100c and the second wall 100d that are adjacent to each other are connected to each other over the entire length. As a result, the barrel portion 100b is formed in an angular cylindrical shape. One end of the barrel portion 100b is closed by the closing portion 100a. On the other hand, the other end of the barrel portion 100b is an open end closed by the lid plate 101.

In the embodiment, the surface area of the first wall 100c is larger than the surface area of the second wall 100d. Correspondingly, the barrel portion 100b is formed in a flat angular cylindrical shape.

The energy storage apparatus according to the embodiment includes a plurality of energy storage devices 1. The plurality of energy storage devices 1 is arranged in a row in one direction. In the embodiment, the plurality of energy storage devices 1 is arranged in a row in a state where the first walls 100c of the cases 10 are directed in one direction. The energy storage apparatus includes a bus bar that electrically connects the external terminals 11 of the two adjacent energy storage devices 1 to each other.

In the following description, for the sake of convenience, the direction (first direction) in which the energy storage devices 1 are arranged in a row is referred to as the X axis direction. Further, one direction (second direction) of two axial directions that are orthogonal to the direction (X axis direction) in which the energy storage devices 1 are arranged in a row is referred to as the Y axis direction, and the remaining one direction (third direction) is referred to as the Z axis direction. Correspondingly, in each drawing, three orthogonal axes (coordinate axes) that respectively correspond to the X axis direction, the Y axis direction and the Z axis direction are shown complementarily.

The spacer 2 has an insulating property. The spacer 2 includes a base adjacent to the case 10 (the first wall 100c of the barrel portion 100b) of the energy storage device 1, and a restricting portion that prevents positional displacement of the energy storage device 1 adjacent to the base. Moreover, the spacer 2 includes an extending portion extending in the X axis direction from the base.

The spacer 2 can be made of a material such as polypropylene, polyphenylene sulfide or polybutylene terephthalate. Preferably, these materials have rigidity increased by containing fibers such as glass fibers or aramid fibers. The spacer 2 in the embodiment is made of polypropylene containing glass fibers.

Figure 5:
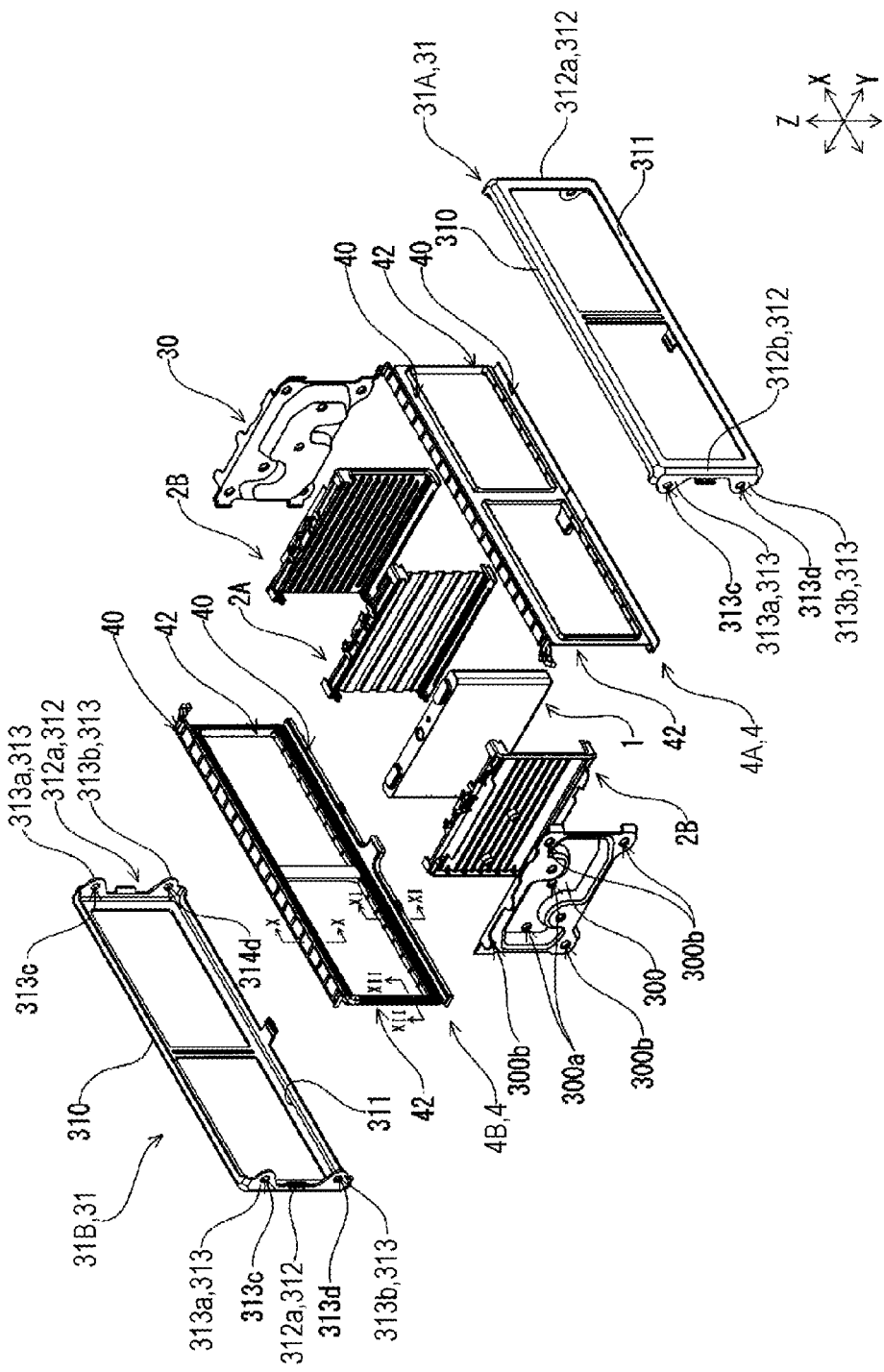
FIG. 5 is a perspective view of the energy storage apparatus.

The spacer 2 will be described more specifically. As described above, the energy storage apparatus includes the plurality of energy storage devices 1. Correspondingly, the energy storage apparatus includes a plurality of spacers 2 each arranged adjacently to the energy storage device 1 in the X axis direction. Moreover, as shown in FIG. 5, the energy storage apparatus includes two kinds of the spacers 2 (2A and 2B). That is, the energy storage apparatus includes, as the spacers 2, the spacer (hereinafter referred to as the inner spacer) 2A arranged between the two energy storage devices 1, and the spacer (hereinafter referred to as the outer spacer) 2B adjacent to the energy storage device 1 at an outermost end among the plurality of energy storage devices 1.

Figure 6:
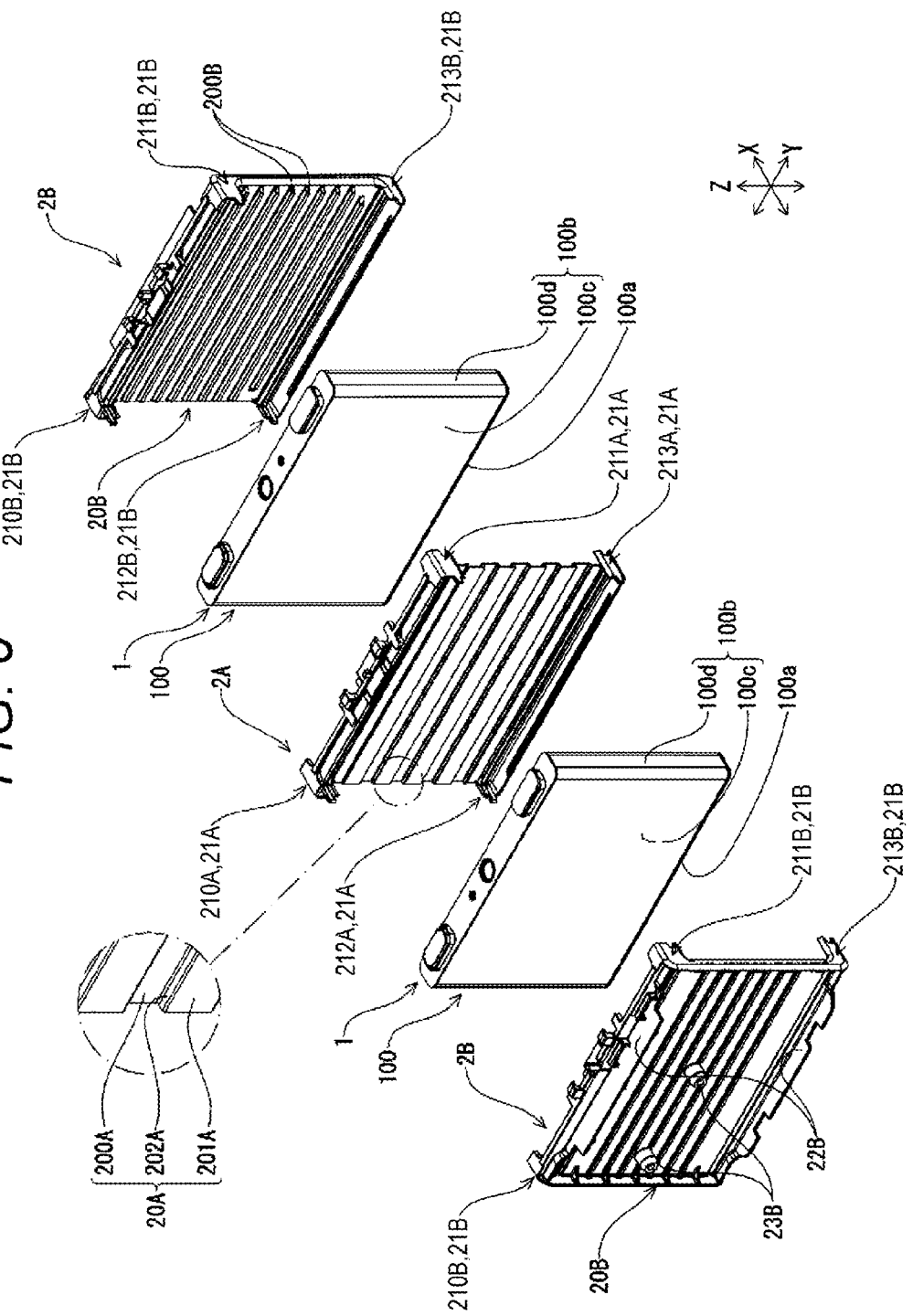
FIG. 6 is a perspective view of inner spacers, outer spacers and the energy storage devices in the energy storage apparatus.

Firstly, the inner spacer 2A is described. As shown in FIG. 6, the inner spacer 2A includes a base 20A adjacent to the energy storage device 1 (the first wall 100c of the case body 100), and the restricting portion 21A that prevents the positional displacement of the two energy storage devices 1 adjacent to the base 20A. Further, the inner spacer 2A includes an extending portion 22A that extends from the base 20A in the X axis direction (see FIG. 6).

The base 20A of the inner spacer 2A is sandwiched between the two energy storage devices 1. Accordingly, the base 20A of the inner spacer 2A includes a first surface facing the one of the two adjacent energy storage devices 1, and a second surface opposite to the first surface and facing the other of the two energy storage devices 1.

The base 20A of the inner spacer 2A includes a first end arranged at a position corresponding to the lid plate 101 of the energy storage device 1, and a second end opposite to the first end and arranged at a position corresponding to the closing portion 100a of the energy storage device 1. Moreover, the base 20A of the inner spacer 2A includes a third end arranged at a position corresponding to the one of the second walls 100d of the energy storage device 1, and a fourth end opposite to the third end and arranged at a position corresponding to the other second wall 100d of the energy storage device 1.

The base 20A of the inner spacer 2A includes a first corner portion that is a portion where the first end and the third end of the base 20A are connected to each other, and a second corner portion that is a portion where the first end and the fourth end are connected to each other. Moreover, the base 20A of the inner spacer 2A includes a third corner portion that is a portion where the second end and the third end are connected to each other, and a fourth corner portion that is portion where the second end and the fourth end are connected to each other.

The first end and the second end of the base 20A of the inner spacer 2A extend in the Y axis direction. Then, the third end and the fourth end of the base 20A of the inner spacer 2A extend in the Z axis direction. Accordingly, the base 20A of the inner spacer 2A is formed in a substantially rectangular shape. Moreover, the base 20A of the inner spacer 2A is formed to have substantially the same size as that of the first wall 100c of the energy storage device 1.

In the energy storage apparatus according to the embodiment, a passage 23A through which a fluid (cooling fluid) passes is formed in at least either between the first surface of the base 20A of the inner spacer 2A and the energy storage device 1 or between the second surface of the base 20A of the inner spacer 2A and the energy storage device 1. That is, the base 20A of the inner spacer 2A forms the passage 23A between the base 20A and the energy storage device 1 adjacent in the X axis direction (in the embodiment, between the base 20A and each of the energy storage devices 1 adjacent in the X axis direction).

More specifically, in the energy storage device 1 in the embodiment, the base 20A of the inner spacer 2A is formed in a rectangular corrugated shape. The base 20A of the inner spacer 2A includes a first contact portion 200A that is in contact with only the one of the two adjacent energy storage devices 1, and a second contact portion 201A that is in contact with only the other of the two adjacent energy storage devices 1. Correspondingly, the base 20A of the inner spacer 2A includes a connecting portion 202A that is connected to the first contact portion 200A and the second contact portion 201A.

The first contact portion 200A has a long side in the Y axis direction. The second contact portion 201A has a long side in the Y axis direction.

The base 20A of the inner spacer 2A includes a plurality of first contact portions 200A and a plurality of second contact portions 201A. Then, each first contact portion 200A and each second contact portion 201A are alternately arranged in the direction in which the first end and the second end of the base 20A of the inner spacer 2A are arranged as aligned to each other.

As a result, in the energy storage apparatus, the passage 23A is formed by a surface opposite to a surface being contact with the energy storage device 1 in the first contact portion 200A and a pair of connecting portions 202A that are connected to the first contact portion 200A. Moreover, in the energy storage apparatus, the passage 23A is formed by a surface opposite to a surface being contact with the energy storage device 1 in the second contact portion 201A and the pair of connecting portions 202A that are connected to the second contact portion 201A. Therefore, in the energy storage apparatus, the passage 23A is formed between the first surface of the base 20A of the inner spacer 2A and the energy storage device 1, and the passage 23A is also formed between the second surface of the base 20A of the inner spacer 2A and the energy storage device 1.

Therefore, in the energy storage apparatus, the base 20A of the inner spacer 2A forms the passage 23A that communicates opposite ends in the Y axis direction. Accordingly, the cooling fluid supplied to a periphery of the energy storage apparatus flows through the passage 23A (the passage 23A formed by the base 20A of the inner spacer 2A) from the one end to the other end in the Y axis direction.

Figure 9:
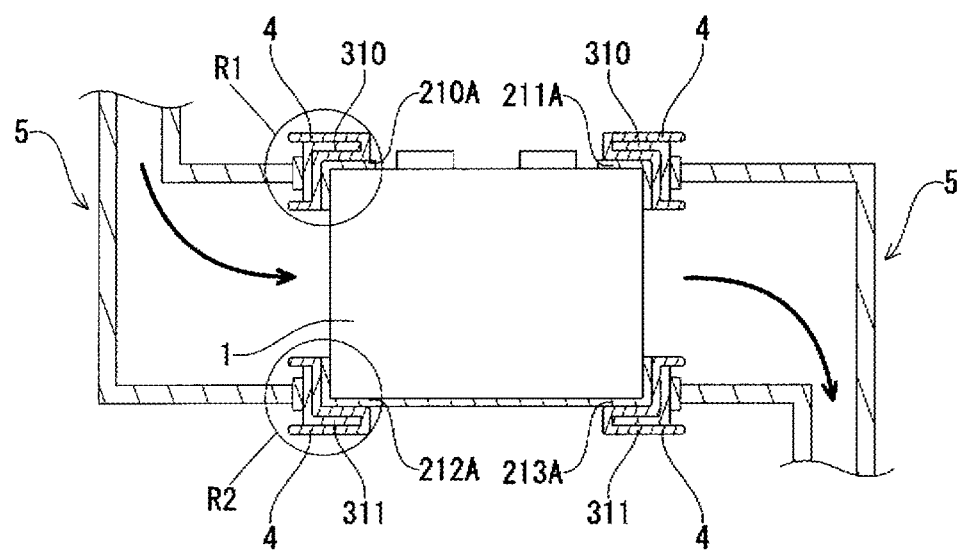
FIG. 9 is a sectional view of the energy storage apparatus, in which ducts are mounted to the energy storage apparatus.

As shown in FIG. 9, the energy storage apparatus according to the embodiment further includes ducts 5 arranged respectively on one side in the Y axis direction of each of the plurality of energy storage devices 1, and on the other side in the Y axis direction of each of the plurality of energy storage devices 1.

Accordingly, the one of the ducts 5 is arranged at a position adjacent to the one end in the Y axis direction of each of a plurality of passages 23A. The other of the ducts 5 is arranged at a position adjacent to the other end in the Y axis direction of each of the plurality of passages 23A.

Further, an intake fan (not shown) is connected to the one of the ducts 5. Accordingly, in the energy storage apparatus, the cooling fluid sucked into the one of the ducts 5 by the intake fan is led from the one end to the other end in the Y axis direction of the passage 23A, and discharged from the other duct 5.

As described above, the inner spacer 2A is arranged between the two adjacent energy storage devices 1. Accordingly, as shown in FIG. 6, in order to restrict relative movement between the two energy storage devices 1 adjacent to the inner spacer 2A, the restricting portion 21A extends toward the energy storage device 1 adjacent to the first surface of the base 20A of the inner spacer 2A and toward the energy storage device 1 adjacent to the second surface of the base 20A of the inner spacer 2A.

More specifically, the restricting portion 21A is formed in each of the corner portions of the base 20A of the inner spacer 2A. The inner spacer 2A includes, as the restricting portion 21A, a first restricting portion 210A formed in the first corner portion, a second restricting portion 211A formed in the second corner portion, a third restricting portion 212A formed in the third corner portion, and a fourth restricting portion 213A formed in the fourth corner portion.

The first restricting portion 210A and the second restricting portion 211A extend toward the energy storage device 1 adjacent to the first surface of the base 20A of the inner spacer 2A and toward the energy storage device 1 adjacent to the second surface of the base 20A of the inner spacer 2A.

The first restricting portion 210A is in contact with the lid plate 101 and the one of the second walls 100d of the barrel portion 100b of each of the energy storage devices 1 arranged on both sides of the base 20A of the inner spacer 2A. Then, the second restricting portion 211A is in contact with the lid plate 101 and the other second wall 100d of the barrel portion 100b of each of the energy storage devices 1 arranged on both sides of the base 20A of the inner spacer 2A.

The third restricting portion 212A and the fourth restricting portion 213A extend toward the energy storage device 1 adjacent to the first surface of the base 20A of the inner spacer 2A and toward the energy storage device 1 adjacent to the second surface of the base 20A of the inner spacer 2A.

The third restricting portion 212A is in contact with the closing portion 100a and the one of the second walls 100d of the barrel portion 100b of each of the energy storage devices 1 arranged on both sides of the base 20A of the inner spacer 2A. Then, the fourth restricting portion 213A arranged on the other side is in contact with the closing portions 100a and the other second walls 100d of the barrel portions 100b of the energy storage devices 1 arranged on both sides of the base 20A of the inner spacer 2A.

In the inner spacer 2A in the embodiment, the extending portion 22A is integrally formed with the restricting portion 21A. That is, the inner spacer 2A includes the extending portion 22A as the restricting portion 21A.

Figure 7:
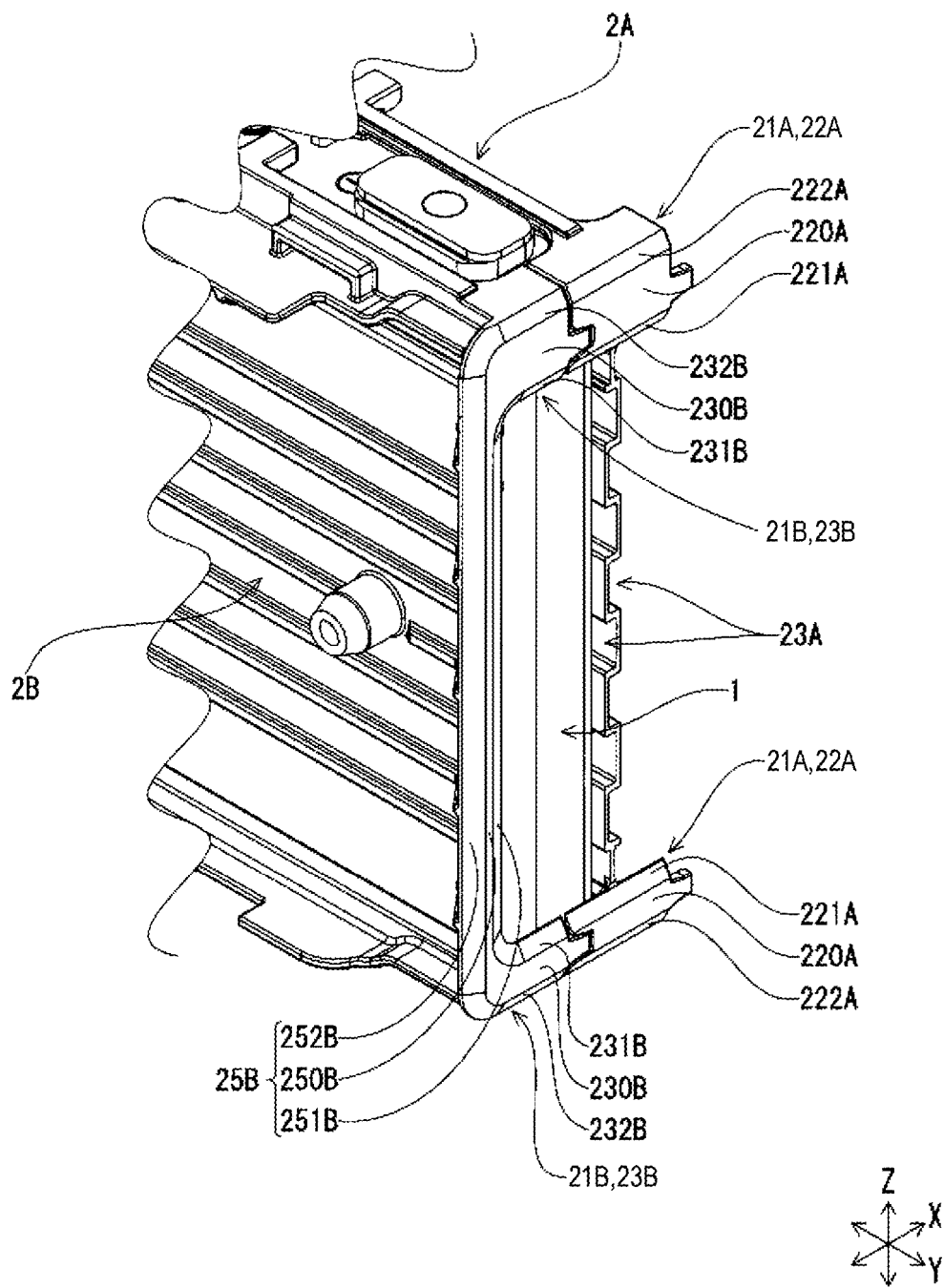
FIG. 7 is a perspective view of the inner spacer, one of the outer spacers and the energy storage device in the energy storage apparatus.
Figure 8:
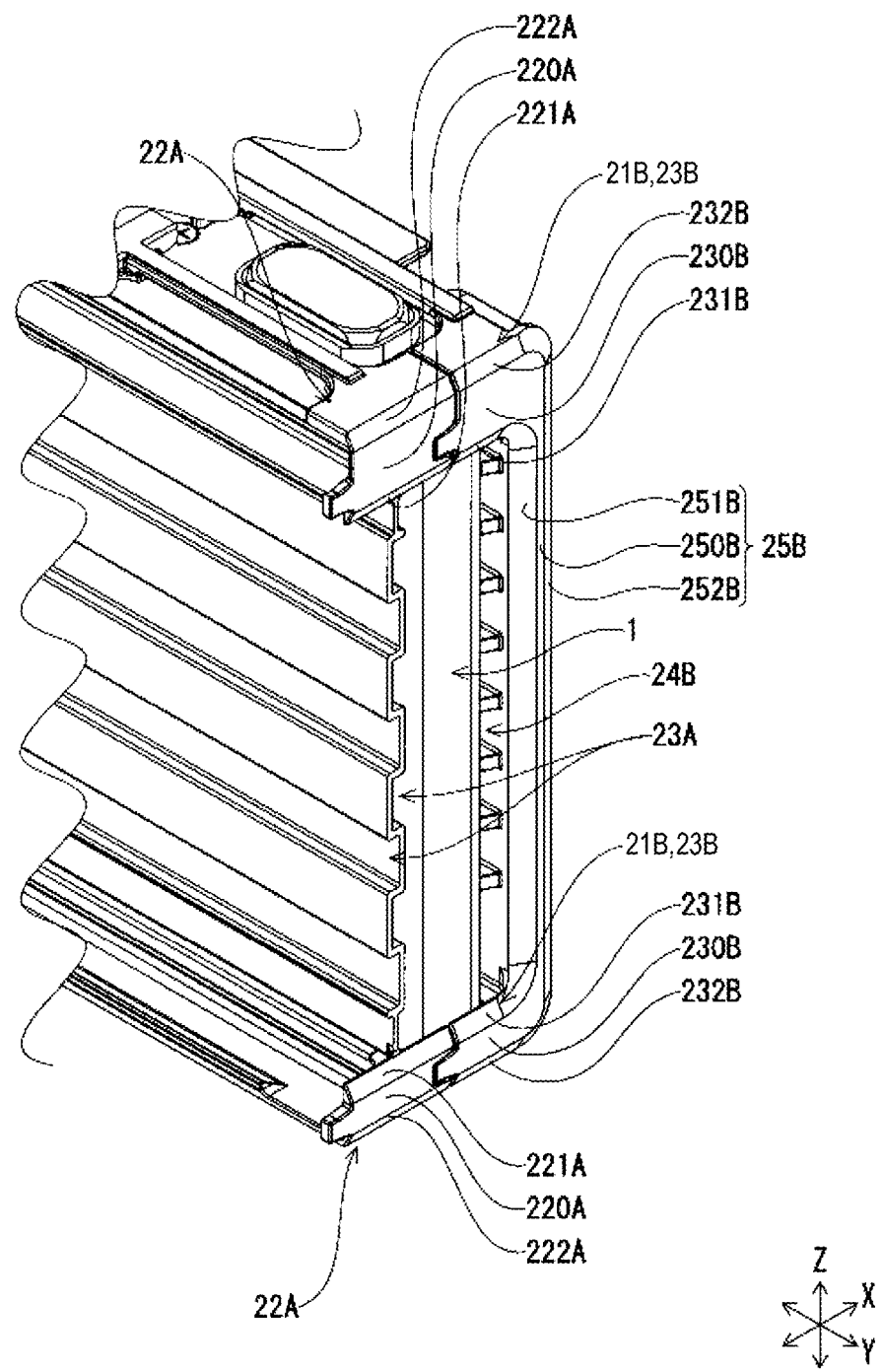
FIG. 8 is a perspective view of the inner spacer, the other outer spacer and the energy storage device in the energy storage apparatus.

More specifically, as shown in FIG. 7 and FIG. 8, the extending portion 22A is bent. The insulator 4 is in contact with an outer corner surface of the extending portion 22A.

The outer corner surface of the extending portion 22A includes a reference surface 220A that extends in the X axis direction and the Z axis direction. Moreover, the outer corner surface of the extending portion 22A includes a pair of surfaces to be contacted 221A and 222A that extend respectively from opposite ends in the Z axis direction of the reference surface 220A. In the description of the energy storage apparatus according to the embodiment, the one surface to be contacted 221A may be referred to as the first surface to be contacted 221A, and the other surface to be contacted 222A may be referred to as the second surface to be contacted 222A.

The first surface to be contacted 221A and the second surface to be contacted 222A are displaced toward one side in the Y axis direction as the first surface to be contacted 221A and the second surface to be contacted 222A extend from the reference surface 220A. That is, the first surface to be contacted 221A and the second surface to be contacted 222A are inclined with respect to a plane extending in the X axis direction and the Z axis direction. The first surface to be contacted 221A is arranged at a position where the first surface to be contacted 221A is closer to the passage 23A than the second surface to be contacted 222A is.

As described above, the restricting portion 21A is formed in each of the corner portions of the base 20A of the inner spacer 2A. That is, the base 20A of the inner spacer 2A includes a plurality of (four) extending portions 22A formed respectively in the corner portions. Then, among the plurality of extending portions 22A, each pair of extending portions 22A arranged as aligned to each other in the Z axis direction are arranged such that the first surfaces to be contacted 221A of the pair of extending portions 22A are arranged adjacently to each other in the Z axis direction.

Since the energy storage apparatus according to the embodiment includes the plurality of energy storage devices 1 as described above, the inner spacer 2A is arranged between the adjacent energy storage devices 1. That is, the energy storage apparatus includes a plurality of inner spacers 2A.

Then, the extending portion 22A of each of the plurality of inner spacers 2A is adjacent to the extending portion 22A of the inner spacer 2A adjacent in the X axis direction. Accordingly, each of the reference surfaces 220A of the respective extending portions 22A adjacent to each other in the X axis direction is positioned on the same plane or on substantially the same plane. Moreover, each of the first surfaces to be contacted 221A of the respective extending portions 22A adjacent to each other in the X axis direction is positioned on the same plane or on substantially the same plane. Further, each of the second surfaces to be contacted 222A of the respective extending portions 22A adjacent to each other in the X axis direction is positioned on the same plane or on substantially the same plane.

Next, the outer spacer 2B will be described. The outer spacer 2B is the spacer 2 arranged at an end portion in the X axis direction (the spacer 2 arranged on the outermost side in the X axis direction), among the plurality of spacers 2.

As shown in FIG. 6, the outer spacer 2B includes a base (hereinafter referred to as a base) 20B having a first surface facing the energy storage device 1 (the first wall 100c of the case body 100) and a second surface opposite to the first surface, and a restricting portion (hereinafter referred to as a restricting portion) 21B that determines a position of the energy storage device 1 adjacent to the base 20B.

Moreover, in the outer spacer 2B in the embodiment, the base 20B faces an end plate 30 described later of the holder 3. That is, the outer spacer 2B is arranged between the energy storage device 1 and the end plate 30. Correspondingly, the outer spacer 2B includes a fitting portion 22B fitted to the end plate 30 at a position where the base 20B faces the end plate 30. That is, the outer spacer 2B includes the fitting portion 22B for determining a position of the end plate 30 with respect to the base 20B, and the fitting portion 22B is formed on the second surface of the base 20B.

Further, the outer spacer 2B includes an extending portion 23B that extends in the X axis direction from the base 20A.

In the embodiment, the outer spacer 2B includes an inner contact portion 200B that projects from the first surface of the base 20B toward the energy storage device 1 and is in contact with the energy storage device 1.

The base 20B of the outer spacer 2B extends in the Y axis direction and the Z axis direction that are orthogonal to the X axis direction. That is, the base 20B is formed in a plate shape. The base 20B of the outer spacer 2B includes a first end arranged at a position corresponding to the lid plate 101 of the energy storage device 1, and a second end opposite to the first end and arranged at a position corresponding to the closing portion 100a of the energy storage device 1. Moreover, the base 20B of the outer spacer 2B includes a third end arranged at a position corresponding to the one of the second walls 100d of the energy storage device 1, and a fourth end opposite to the third end and arranged at a position corresponding to the other second wall 100d of the energy storage device 1.

The base 20B of the outer spacer 2B includes a first corner portion that is a portion where the first end and the third end are connected to each other, and a second corner portion that is a portion where the first end and the fourth end are connected to each other. Moreover, the base 20B of the outer spacer 2B includes a third corner portion that is a portion where the second end and the third end are connected to each other, and a fourth corner portion that is a portion where the second end and the fourth end are connected to each other.

The first end and the second end of the base 20B of the outer spacer 2B extend in the Y axis direction. Then, the third end and the fourth end of the base 20B of the outer spacer 2B extend in the direction orthogonal to the Z axis direction. Accordingly, the base 20B of the outer spacer 2B has a substantially rectangular shape. Moreover, the base 20B of the outer spacer 2B has substantially the same size as that of the first wall 100c of the energy storage device 1.

A passage 24B through which the fluid passes between the first surface of the base 20B and the energy storage device 1 is formed on the first surface of the base 20B of the outer spacer 2B. That is, the base 20B of the outer spacer 2B forms the passage 24B between the base 20B and the energy storage device 1 adjacent in the X axis direction.

More specifically, the base 20B of the outer spacer 2B includes the inner contact portion 200B that extends from the first surface of the base 20B toward the case 10 of the energy storage device 1 (the first wall 100c of the case body 100).

The inner contact portion 200B has a long side in the Y axis direction. The base 20B of the outer spacer 2B in the embodiment includes a plurality of inner contact portions 200B. Then, the plurality of inner contact portions 200B is spaced apart from each other in the direction orthogonal to the longitudinal direction. As a result, a plurality of passages 24B is formed between the base 20B of the outer spacer 2B and the energy storage device 1.

Therefore, in the energy storage apparatus, the base 20B of the outer spacer 2B forms the passages 24B that communicates the opposite ends in the Y axis direction. Accordingly, the cooling fluid supplied to the periphery of the energy storage apparatus flows through the passages 24B from the one end to the other end in the Y axis direction.

As described above, the energy storage apparatus according to the embodiment further includes the ducts 5 arranged respectively on one side in the Y axis direction of each of the plurality of energy storage devices 1, and on the other side in the Y axis direction of each of the plurality of energy storage devices 1 (see FIG. 9).

Accordingly, the one of the ducts 5 is arranged at a position adjacent to one end in the Y axis direction of each of the plurality of passages 24B. The other duct 5 is arranged at a position adjacent to the other end in the Y axis direction of each of the plurality of passages 24B.

Accordingly, in the energy storage apparatus, the cooling fluid sucked into the one of the ducts 5 by the intake fan is led from the one end to the other end in the Y axis direction of each passage 24B, and is discharged from the other duct 5.

As described above, the first surface of the outer spacer 2B is adjacent to the energy storage device 1. In order to restrict relative movement of the energy storage device 1 adjacent to the first surface of the outer spacer 2B, the restricting portion 21B extends toward the energy storage device 1 adjacent to the first surface of the base 20B of the outer spacer 2B.

More specifically, the outer spacer 2B includes, as the restricting portion 21B, the restricting portion 21B formed at the first end of the base 20B, and the restricting portion 21B formed at the second end of the base 20B.

The outer spacer 2B includes, as the restricting portion 21B, a first restricting portion 210B formed in the first corner portion, a second restricting portion 211B formed in the second corner portion, a third restricting portion 212B formed in the third corner portion, and a fourth restricting portion 213B formed in the fourth corner portion.

As described above, the first surface of the base 20B of the outer spacer 2B faces the energy storage device 1. Accordingly, the first restricting portion 210B and the second restricting portion 211B extend toward the energy storage device 1 adjacent to the first surface of the base 20B of the outer spacer 2B.

The first restricting portion 210B is in contact with a first end of the lid plate 101 and the second wall 100d of the barrel portion 100b of the energy storage device 1 adjacent to the first surface of the base 20B of the outer spacer 2B. Then, the second restricting portion 211B is in contact with a second end of the lid plate 101 and the second wall 100d of the barrel portion 100b of the energy storage device 1 adjacent to the first surface of the base 20B of the outer spacer 2B.

As described above, the first surface of the base 20B of the outer spacer 2B faces the energy storage device 1. Accordingly, the third restricting portion 212B and the fourth restricting portion 213B extend toward the energy storage device 1 adjacent to the first surface of the base 20B of the outer spacer 2B.

The third restricting portion 212B is in contact with a first end of the closing portion 100a and the second wall 100d of the barrel portion 100b of the energy storage device 1 adjacent to the first surface of the base 20B of the outer spacer 2B. Then, the fourth restricting portion 213B is in contact with the second end of the closing portion 100a and the second wall 100d of the barrel portion 100b of the energy storage device 1 adjacent to the first surface of the base 20B of the outer spacer 2B.

The restricting portion 21B includes the extending portion 23B that extends from the second surface of the base 20B of the outer spacer 2B toward the holder 3 (the end plate 30 described later).

In the outer spacer 2B in the embodiment, the extending portion 23B is integrally formed with the restricting portion 21B. That is, the outer spacer 2B includes the extending portion 23B as the restricting portion 21B.

More specifically, the extending portion 23B is bent. The insulator 4 is in contact with an outer corner surface of the extending portion 23B.

As shown in FIG. 7 and FIG. 8, the outer corner surface of the extending portion 23B includes a reference surface 230B that extends in the Y axis direction and the Z axis direction. Moreover, the outer corner surface of the extending portion 23B includes a pair of surfaces to be contacted 231B and 232B that extend respectively from the opposite ends in the Z axis direction of the reference surface 230B. In the description of the energy storage apparatus according to the embodiment, the one surface to be contacted 231B may be referred to as the first surface to be contacted 231B, and the surface to be contacted 232B may be referred to as the second surface to be contacted 232B.

The first surface to be contacted 231B and the second surface to be contacted 232B are displaced toward one side in the Y axis direction as the first surface to be contacted 231B and the second surface to be contacted 232B extend from the reference surface 230B. That is, the first surface to be contacted 231B and the second surface to be contacted 232B are inclined with respect to a plane extending in the X axis direction and the Z axis direction. The first surface to be contacted 231B is arranged at a position where the first surface to be contacted 231B is closer to the passage 23A than the second surface to be contacted 232B is.

As described above, the restricting portion 21A is formed in each of the corner portions of the base 20B of the outer spacer 2B. That is, the base 20B of the outer spacer 2B includes a plurality of (four) extending portions 23B formed respectively in the corner portions. Then, among the plurality of extending portions 23B, each pair of extending portions 23B arranged as aligned to each other in the Z axis direction are arranged such that the first surfaces to be contacted 231B of the pair of extending portions 23B are arranged adjacently to each other in the Z axis direction. Correspondingly, the outer spacer 2B includes a connecting side 25B that is continuous throughout the extending portion 23B formed on the one end in the Z axis direction of the base 20B and the extending portion 23B formed on the other end in the Z axis direction of the base 20B.

The connecting side 25B includes a reference surface 250B that extends in the X axis direction and the Y axis direction, and a pair of surfaces to be pressed 251B and 252B that are formed respectively on opposite ends in the X axis direction of the reference surface 250B. In the description of the energy storage apparatus according to the embodiment, the one surface to be pressed 251B may be referred to as the first surface to be pressed 251B, and the other surface to be pressed 252B may be referred to as the second surface to be pressed 252B.

The reference surface 250B of the connecting side 25B is continuous with the reference surface 230B of the one of the extending portions 23B and the reference surface 230B of the other extending portion 23B.

The first surface to be pressed 251B and the second surface to be pressed 252B of the connecting side 25B are displaced toward one side in the Y axis direction as the first surface to be pressed 251B and the second surface to be pressed 252B extend from the reference surface 250B. That is, the first surface to be pressed 251B and the second surface to be pressed 252B are inclined with respect to a flat surface extending in the X axis direction and the Z axis direction.

The first surface to be pressed 251B is arranged at a position where the first surface to be pressed 251B is closer to the passage 24B than the second surface to be pressed 252B is.

In the outer spacer 2B, the first surface to be pressed 251B of the connecting side 25B is continuous with the first surface to be contacted 231B of one of the extending portions 23B and the surface to be contacted 231B of the other extending portion 23B. In the outer spacer 2B, the second surface to be pressed 252B of the connecting side 25B is continuous with the second surface to be contacted 232B of the one extending portion 23B and the second surface to be contacted 232B of the other extending portion 23B.

As described above, the outer spacer 2B in the embodiment is arranged adjacently to the inner spacer with the energy storage device 1 interposed therebetween. That is, the energy storage apparatus includes a pair of outer spacers 2B. Each of the outer spacers 2B is adjacent to the outermost energy storage device 1 among the plurality of energy storage devices 1. That is, the pair of outer spacers 2B are provided so as to sandwich the plurality of energy storage devices 1 arranged in a row therebetween.

Moreover, as described above, each of the pair of outer spacers 2B has the first surface that faces the case body 100 of the energy storage device 1. Accordingly, each of the pair of outer spacers 2B is arranged such that the first surfaces of the bases 20B of the outer spacers 2B face each other. Therefore, in the energy storage apparatus, each of the pair of outer spacers 2B is arranged such that the outer spacers 2B are symmetrical with each other in the direction in which the plurality of energy storage devices 1 is arranged in a row (hereinafter, referred to as the X axis direction).

Then, the extending portion 23B of each of the plurality of the outer spacers 2B is adjacent to the extending portion 22A of the inner spacer 2A adjacent in the X axis direction. Accordingly, the reference surface 230B of each extending portion 23B of the outer spacer 2B, and the reference surface 220A of each extending portion 22A of the inner spacer 2A adjacent to the outer spacer 2B in the X axis direction are positioned on the same plane or on substantially the same plane. Moreover, the first surface to be contacted 231B of each extending portion 23B of the outer spacer 2B and the first surface to be contacted 221A of each extending portion 22A of the inner spacer 2A adjacent to the outer spacer 2B in the X axis direction are positioned on the same plane or on substantially the same plane. Further, the second surface to be contacted 232B of each extending portion 23B of the outer spacer 2B and the second surface to be contacted 222A of each extending portion 22A of the inner spacer 2A adjacent to the outer spacer 2B in the X axis direction are positioned on the same plane or on substantially the same plane.

Figure 2:
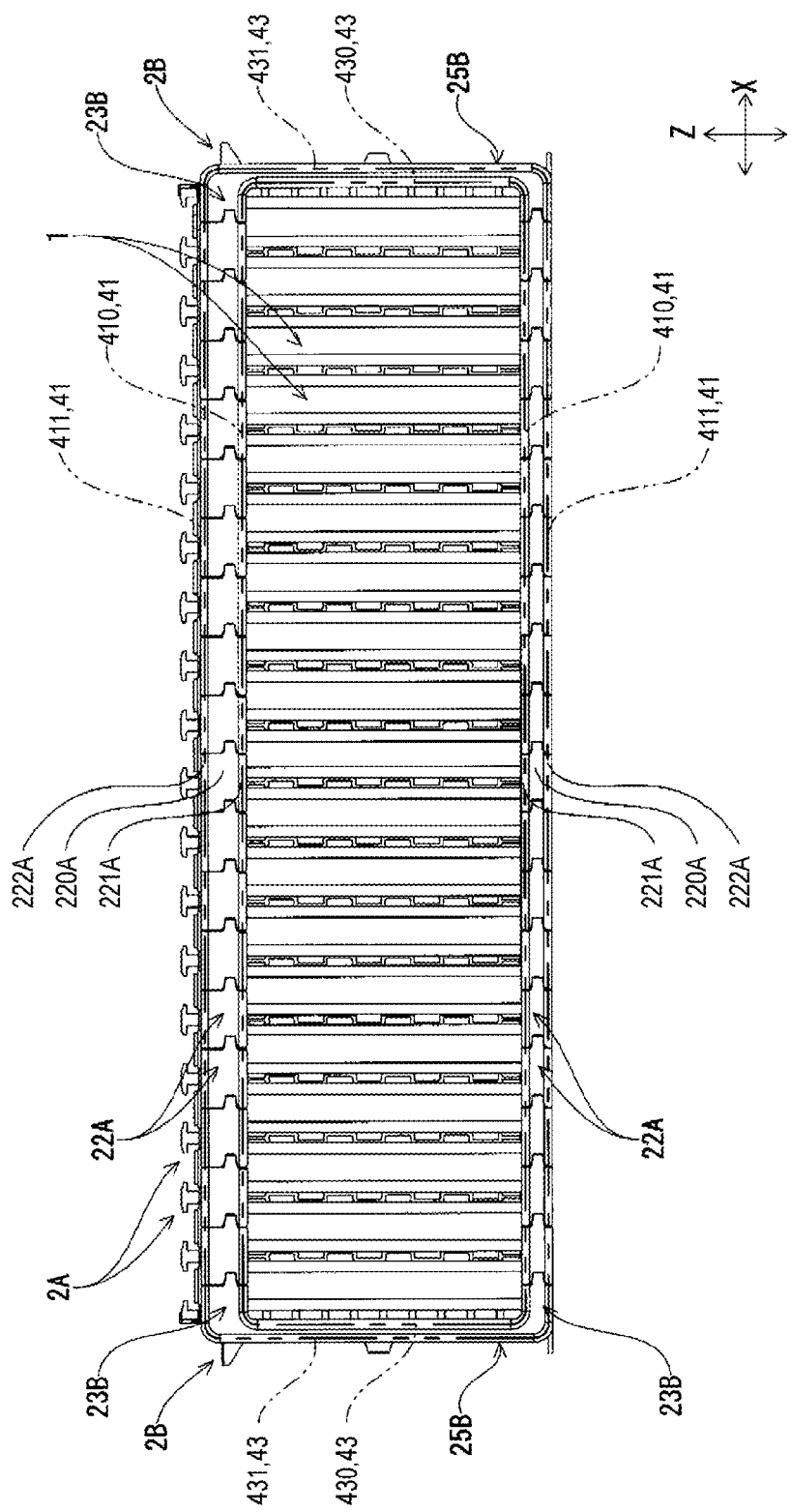
FIG. 2 is a side view of the energy storage apparatus.

Therefore, as shown in FIG. 2, at each of the opposite ends in the Y axis direction of the energy storage apparatus, the first surface to be contacted 221A of the extending portion 22A of each inner spacer 2A, the first surface to be contacted 231B of the extending portion 23B of each outer spacer 2B, and the first surface to be pressed 251B of the connecting side 25B of each outer spacer 2B are arranged as aligned to each other so as to enclose the passage 23A formed by the base 20A of each inner spacer 2A and the passage 24B formed by the base 20B of each outer spacer 2B.

Accordingly, at each of the opposite ends in the Y axis direction of the energy storage apparatus, the second surface to be contacted 222A of the extending portion 22A of each inner spacer 2A, the second surface to be contacted 232B of the extending portion 23B of each outer spacer 2B, and the second surface to be pressed 252B of the connecting side 25B of each outer spacer 2B are arranged as aligned to each other so as to enclose each of the first surface to be contacted 221A of the extending portion 22A of each inner spacer 2A, the first surface to be contacted 231B of the extending portion 23B of each outer spacer 2B and the first surface to be pressed 251B of the connecting side 25B of each outer spacer 2B.

In the embodiment, the holder 3 is made of metal. Moreover, the holder 3 holds the plurality of energy storage devices 1 and the plurality of spacers 2 (the inner spacers 2A and the outer spacers 2B). More specifically, as shown in FIG. 5, the holder 3 includes a pair of end plates 30 that are arranged respectively at positions adjacent to the respective outer spacers 2B, and a frame 31 that connects the pair of end plates 30 to each other.

Each of the pair of end plates 30 includes a first surface facing the outer spacer 2B, and a second surface opposite to the first surface.

The end plate 30 includes a first end arranged at a position corresponding to the lid plate 101 of the energy storage device 1, and a second end opposite to the first end (the second end arranged at a position corresponding to the closing portion 100a of the energy storage device 1). Moreover, the end plate 30 includes a third end arranged at a position corresponding to the one of the second walls 100d of the energy storage device 1, and a fourth end opposite to the third end (the fourth end arranged at a position corresponding to the other second wall 100d of the energy storage device 1).

Correspondingly, the end plate 30 includes a first corner portion that is a portion where the first end and the third end are connected to each other, and a second corner portion that is a portion where the first end and the fourth end are connected to each other. Moreover, the end plate 30 includes a third corner portion that is a portion where the second end and the third end are connected to each other, and a fourth corner portion that is a portion where the second end and the fourth end are connected to each other.

The frame 31 includes a connecting portion that extends throughout the pair of end plates 30. In the embodiment, the frame 31 includes a first connecting portion 310 arranged at a position corresponding to the lid plate 101 of the energy storage device 1, and a second connecting portion 311 arranged at a position corresponding to the closing portion 100a of the energy storage device 1. That is, the frame 31 includes the pair of connecting portions 310 and 311 spaced apart in the Z axis direction and arranged as aligned to each other.

The frame 31 in the embodiment is formed in a frame body shape by a support portion 312 connecting the first connecting portion 310 and the second connecting portion 311. Correspondingly, in the following description of the energy storage apparatus according to the embodiment, a member that includes the first connecting portion 310, the second connecting portion 311 and the support portion 312 arranged on one side in the direction orthogonal to the X axis direction (hereinafter referred to as the Y axis direction) of the energy storage device 1 may be referred to as a first connecting member 31A, and a member that includes the first connecting portion 310, the second connecting portion 311 and the support portion 312 arranged on the other side in the Y axis direction of the energy storage device 1 may be referred to as a second connecting member 31B.

Then, the frame 31 includes a fixing portion 313 connected to the end plate 30.

The first connecting portion 310 includes a first end and a second end opposite to the first end, in the direction which forms a long side.

Moreover, the first connecting portion 310 is bent in the direction orthogonal to the direction which forms a long side. A portion of the first connecting portion 310 disposed on one side of a bent portion which forms a boundary is arranged at a position where the portion corresponds to the lid plate 101 of the energy storage device 1. A portion of the first connecting portion 310 disposed on the other side of the bent portion which forms the boundary is arranged at a position where the portion corresponds to the second wall 100d of the energy storage device 1.

The second connecting portion 311 includes a first end and a second end opposite to the first end, in the direction which forms a long side.

The second connecting portion 311 is bent in the direction orthogonal to the direction which forms a long side. Then, a portion of the second connecting portion 311 disposed on one side of a bent portion which forms a boundary is arranged at a position where the portion corresponds to the lid plate 101 of the energy storage device 1, and a portion of the second connecting portion 311 disposed on the other side of the bent portion which forms the boundary is arranged at a position where the portion corresponds to the second wall 100d of the energy storage device 1.

The connecting portion (the first connecting portion 310 and the second connecting portion 311) is preferably bent so as to have a center portion in the X axis direction that projects toward the insulator 4. In this manner, the insulator 4 (a first insulating portion 40 and a first sealing portion 41) is firmly sandwiched between the center portion of the connecting portion (the first connecting portion 310 and the second connecting portion 311) in the X axis direction and the extending portion 22A of the spacer 2 (the spacer 2A).

The support portion 312 includes a first support portion 312a that is connected to the first end of the first connecting portion 310 and the first end of the second connecting portion 311, and a second support portion 312b that is connected to the second end of the first connecting portion 310 and the second end of the second connecting portion 311.

The fixing portion 313 include a pair of first fixing portions 313a that is formed respectively at the first end and the second end of the first connecting portion 310, and a pair of second fixing portions 313b that is formed respectively at the first end and the second end of the second connecting portion 311.

The one of the first fixing portions 313a faces a portion surrounding a through hole 300b of the one of the end plates 30. The other first fixing portion 313a faces a portion surrounding the through hole 300b of the other end plate 300. Then, each of the pair of first fixing portions 313a includes a first hole portion 313c formed at a position corresponding to the through hole 300b.

Accordingly, the first connecting portion 310 is connected to the end plate 30 by threadedly mounting a nut on a bolt that passes through the through hole 300b of the end plate 30 and the first hole portion 313c of the first fixing portion 313a.

The one of the second fixing portions 313b faces a portion surrounding the through hole 300b of the one of the end plates 30. The other second fixing portion 313b faces a portion surrounding the through hole 300b of the other end plate 30. Then, each of the pair of second fixing portions 313b includes a second hole portion 313d formed at a position corresponding to the through hole 300b.

Accordingly, the second connecting portion 311 is connected to the end plate 30 by threadedly mounting a nut on a bolt that passes through the through hole 300b of the end plate 30 and the second hole portion 313d of the second fixing portion 313b.

The insulator 4 is made of a material having an insulation property. The insulator 4 can be made of a material such as polypropylene, polyethylene or polystyrene. Preferably, these materials contain no fiber such as glass fibers or aramid fibers. The insulator 4 in the embodiment is made of polypropylene. Moreover, the insulator 4 is arranged between each of the plurality of spacers 2 (the inner spacers 2A and the outer spacers 2B) and the holder 3.

Accordingly, the insulator 4 includes the first insulating portion 40 arranged between each of the extending portions of the plurality of spacers 2 and the holder 3 and being in contact with the holder 3, and the first sealing portion 41 continuous with the first insulating portion 40 and being in contact with each of the extending portions of the plurality of spacers 2 (see FIG. 2).

Moreover, the insulator 4 includes a second insulating portion 42 arranged between the connecting side 25B of the outer spacer 2B (the spacer 2 arranged at each of the opposite ends in the X axis direction) and the holder 3, and a second sealing portion 43 continuous with the second insulating portion 42 and being in contact with the connecting side 25B of the outer spacer 2B (see FIG. 2).

The first insulating portion 40 is arranged between the first connecting portion 310 and the spacer 2 (the inner spacer 2A and the outer spacer 2B), and the first insulating portion 40 is also arranged between the second connecting portion 311 and the spacer 2 (the inner spacer 2A and the outer spacer 2B). That is, the insulator 4 includes a pair of first insulating portions 40.

Each of the first insulating portions 40 has a long side in the X axis direction. Moreover, the one of the first insulating portions 40 is sandwiched between the first connecting portion 310 and the spacer 2. Accordingly, the one first insulating portion 40 is in contact with the first connecting portion 310. The other first insulating portion 40 is sandwiched between the second connecting portion 311 and the spacer 2. Accordingly, the other first insulating portion 40 is in contact with the second connecting portion 311.

The first sealing portion 41 has elasticity. As described above, the spacer 2 is made of polypropylene containing a glass fiber, and the insulator 4 is made of polypropylene. Accordingly, the first sealing portion 41 has lower rigidity than that of each of the surfaces to be contacted 221A and 222A of the inner spacer 2A and the surfaces to be contacted 231B and 232B of the outer spacer 2B.

Figure 10:
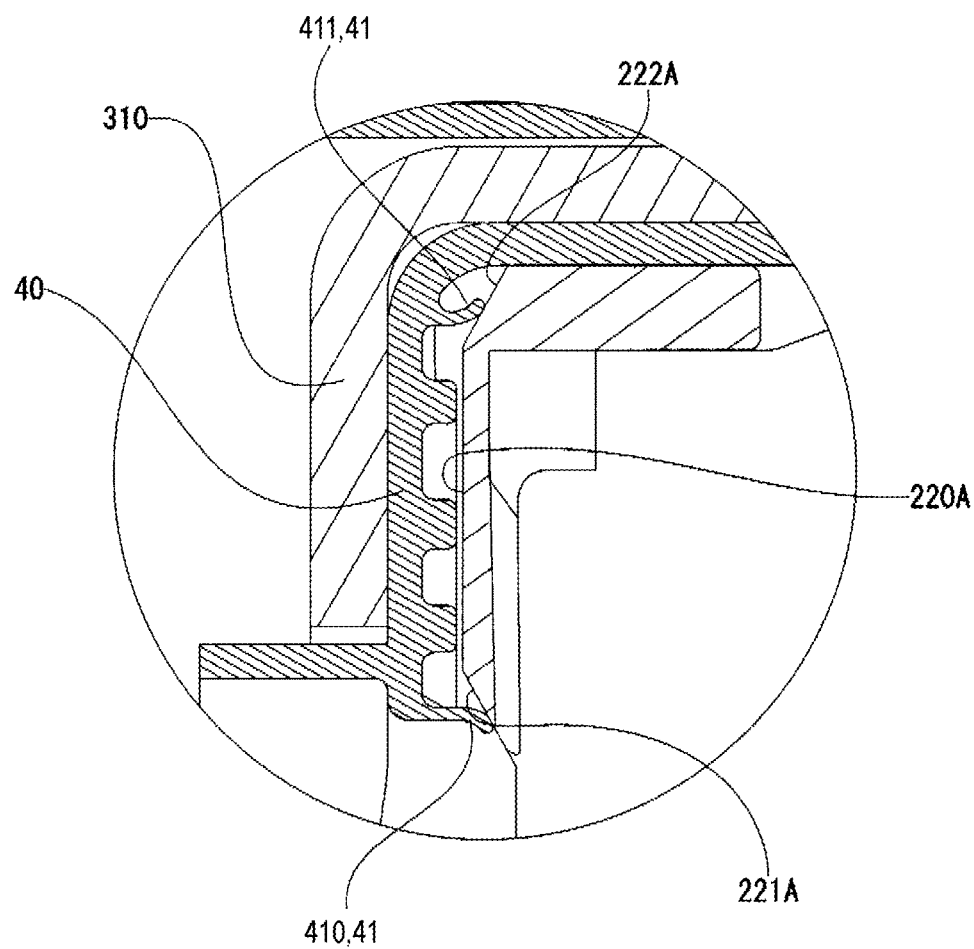
FIG. 10 is a sectional view of the energy storage apparatus, taken along line IX-IX in FIG. 5.
Figure 11:
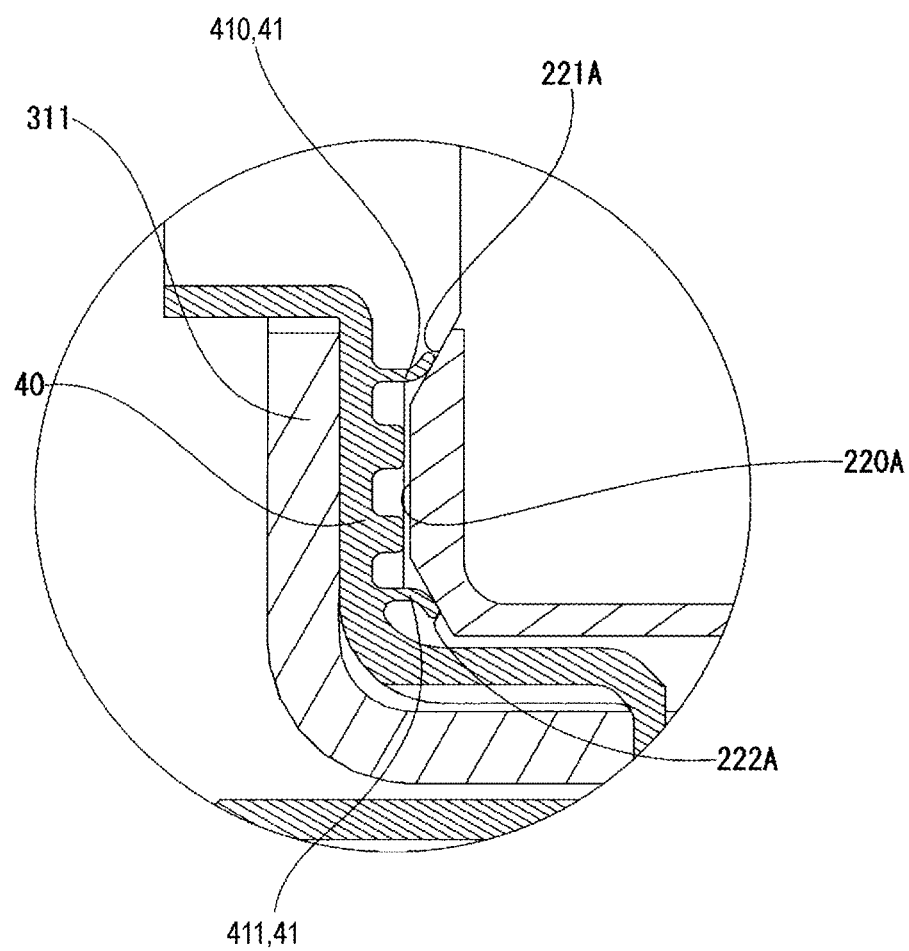
FIG. 11 is a sectional view of the energy storage apparatus, taken along line X-X in FIG. 5.

As shown in FIG. 10 and FIG. 11, the first sealing portion 41 includes a sealing portion 410 that is in contact with the first surface to be contacted 221A of the extending portion 22A of the inner spacer 2A and the first surface to be contacted 231B of the extending portion 23B of the outer spacer 2B, and a sealing portion 411 that is in contact with the second surface to be contacted 222A of the extending portion 22A of the inner spacer 2A and the second surface to be contacted 232B of the extending portion 23B of the outer spacer 2B.

FIG. 10 is a sectional view taken at a position corresponding to a region R1 in FIG. 9, and FIG. 11 is a sectional view taken at a position corresponding to a region R2 in FIG. 9.

The sealing portion 410 on one side is formed in a projecting ridge (in the embodiment, the sealing portion 410 is formed in the projecting ridge having a long side in the X axis direction). The sealing portion 410 on one side extends in the direction inclined with respect to the first surface to be contacted 221A of each inner spacer 2A and the first surface to be contacted 231B of each outer spacer 2B.

As described above, the first surface to be contacted 221A of each inner spacer 2A and the first surface to be contacted 231B of each outer spacer 2B are inclined with respect to a plane extending in the X axis direction and the Z axis direction. Correspondingly, the sealing portion 410 on one side extends straight in the Y axis direction.

The sealing portion 411 on the other side is formed in a projecting ridge (in the embodiment, the sealing portion 411 on the other side is formed in the projecting ridge having a long side in the X axis direction). The sealing portion 411 on the other side extends in the direction inclined with respect to the second surface to be contacted 222A of each inner spacer 2A and the second surface to be contacted 232B of each outer spacer 2B.

As described above, the second surface to be contacted 222A of each inner spacer 2A and the second surface to be contacted 232B of each outer spacer 2B are inclined with respect to a plane extending in the X axis direction and the Z axis direction. Correspondingly, the sealing portion 411 on the other side in the embodiment extends straight in the Y axis direction.

In this manner, in the first sealing portion 41, the sealing portion 410 on one side is in contact with the first surface to be contacted 221A of the extending portion 22A of the inner spacer 2A and the first surface to be contacted 231B of the extending portion 23B of the outer spacer 2B, and the sealing portion 411 on the other side is in contact with the second surface to be contacted 222A of the extending portion 22A of the inner spacer 2A and the second surface to be contacted 232B of the extending portion 23B of the outer spacer 2B. Accordingly, the sealing portion 410 on one side is arranged at a position where the sealing portion 410 on one side is closer to the passages 23A and 24B than the sealing portion 411 on the other side is.

In the first sealing portion 41 in the embodiment, a projecting length of the sealing portion 410 on one side (an extending amount of the sealing portion 410 from the first insulating portion 40) may be the same or substantially the same as, or larger or smaller than a projecting length of the sealing portion 411 on the other side. However, preferably, the projecting length of the sealing portion 410 on one side is larger than the projecting length of the sealing portion 411 on the other side.

As shown in FIG. 5, the second insulating portion 42 is arranged between the first support portion 312a and each of the pair of the outer spacers 2B, and the second insulating portion 42 is also arranged between the second support portion 312b and each of the pair of outer spacers 2B. That is, the insulator 4 includes a pair of second insulating portions 42.

Each of the second insulating portions 42 has a long side in the Z axis direction. The one of the second insulating portions 42 is in contact with the first support portion 312a. The other second insulating portion 42 is in contact with the second support portion 312b.

The second sealing portion 43 has elasticity. As described above, the spacer 2 is made of polypropylene containing a glass fiber, and the insulator 4 is made of polypropylene. Accordingly, the second sealing portion 43 has lower rigidity than that of each of the surfaces to be pressed 251B and 252B of the outer spacer 2B.

Figure 12:
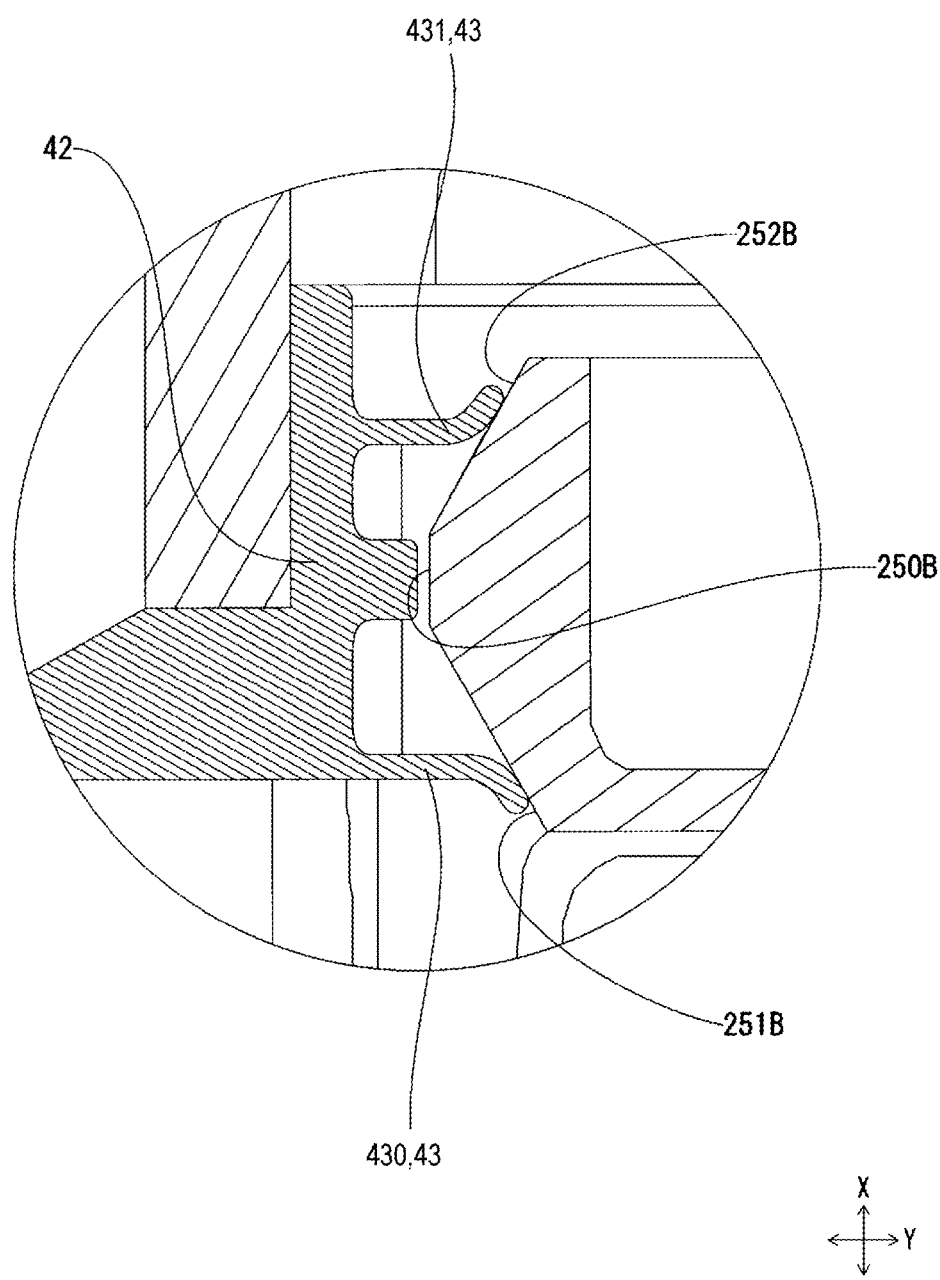
FIG. 12 is a sectional view of the energy storage apparatus, taken along line XI-XI in FIG. 5.

As shown in FIG. 12, the second sealing portion 43 includes a sealing portion 430 being in contact with the first surface to be pressed 251B of the connecting side 25B of the outer spacer 2B, and a sealing portion 431 being in contact with the second surface to be pressed 252B of the connecting side 25B of the outer spacer 2B.

The sealing portion 430 on one side is formed in a projecting ridge (in the embodiment, the sealing portion 430 on one side is formed in the projecting ridge having a long side in the Z axis direction). The sealing portion 430 on one side extends in the direction inclined with respect to the first surface to be pressed 251B.

As described above, the first surface to be pressed 251B is inclined with respect to a plane extending in the X axis direction and the Z axis direction. Correspondingly, the sealing portion 430 on one side extends straight in the Y axis direction.

The sealing portion 431 on the other side is formed in a projecting ridge (in the embodiment, the sealing portion 431 on the other side is formed in the projecting ridge having a long side in the Z axis direction). The sealing portion 431 on the other side extends in the direction inclined with respect to the second surface to be pressed 252B.

As described above, the second surface to be pressed 252B of each outer spacer 2B is inclined with respect to a plane extending in the X axis direction and the Z axis direction. Correspondingly, the sealing portion 431 on the other side extends straight in the Y axis direction.

As described above, in the outer spacer 2B, the first surface to be pressed 251B is arranged at a position where the first surface to be pressed 251B is closer to the passage 24B than the second surface to be pressed 252B is. Accordingly, the sealing portion 430 on one side is arranged at a position where the sealing portion 430 on one side is closer to the passage 24B than the sealing portion 431 is.

In the second sealing portion 43 in the embodiment, a projecting length of the sealing portion 431 on one side (an extending amount of the sealing portion 431 on one side from the second insulating portion 42) may be the same or substantially the same as, or larger or smaller than a projecting length of the sealing portion 431 on the other side. However, preferably, the projecting length of the sealing portion 431 on one side is larger than the projecting length of the sealing portion 431 on the other side.

In the insulator 4, the respective sealing portions 410 of the first sealing portion 41 and the respective sealing portions 430 of the second sealing portion 43 are formed as an integral body. Moreover, in the insulator 4, the respective sealing portions 411 of the first sealing portion 41 and the respective sealing portions 431 of the second sealing portion 43 are formed as an integral body.

Accordingly, in the insulator 4, the respective sealing portions 410 of the first sealing portion 41 and the respective sealing portions 430 of the second sealing portion 43 are enclosed by the respective sealing portions 411 of the first sealing portion 41 and the respective sealing portions 431 of the second sealing portion 43.

As described above, in the energy storage apparatus according to the embodiment, the first insulating portion 40 of the insulator 4 is in contact with the holder 3, and the first sealing portion 41 continuous with the first insulating portion 40 are in contact with the extending portion of the spacer 2 (in the embodiment, the extending portion 22A of the inner spacer 2A and the extending portion 23B of the outer spacer 2B).

Accordingly, the energy storage apparatus can block the cooling fluid that tends to flow into between the holder 3 and the extending portion of the spacer 2, by the first insulating portion 40 of the insulator 4 and the first sealing portion 41 of the insulator 4.

More specifically, as described above, in the energy storage apparatus, the ducts 5 are arranged respectively at the position adjacent to the one end of each of the passages 23A and 24B, and at the position adjacent to the other end of each of the passages 23A and 24B.

Accordingly, in the energy storage apparatus, the cooling fluid tends to flow into between the insulator 4 and the spacer 2 (in the embodiment, between the outer corner surface of the extending portion 22A of the inner spacer 2A and the first insulating portion 40 of the insulator 4, and between the outer corner surface of the extending portion 23B of the outer spacer 2B and the first insulating portion 40 of the insulator 4).

However, in the energy storage apparatus according to the embodiment, the first sealing portion 41 continuous with the first insulating portion 40 is in contact with the extending portion 22A of the inner spacer 2A and the extending portion 23B of the outer spacer 2B. Accordingly, the energy storage apparatus according to the embodiment can block the flow of the cooling fluid that tends to flow into between the outer corner surface of the extending portion 22A of the inner spacer 2A and the first insulating portion 40 of the insulator 4 and between the outer corner surface of the extending portion 23B of the outer spacer 2B and the first insulating portion 40 of the insulator 4.

Therefore, the energy storage apparatus can lead the fluid that tends to flow into between the holder 3 and the extending portion of the spacer 2 to flow through the respective passages 23A and 24B. In this manner, the energy storage apparatus can suppress loss of the cooling fluid flowing through the passages 23A and 24B.

Moreover, the first sealing portion 41 has elasticity and lower rigidity than that of each of the first surface to be contacted 221A of the inner spacer 2A and the first surface to be contacted 231B of the outer spacer 2B.

Accordingly, the first sealing portion 41 is elastically deformed by being in contact with the first surface to be contacted 221A of the inner spacer 2A and the first surface to be contacted 231B of the outer spacer 2B. As a result, an elastic force acts on the first sealing portion 41.

In the embodiment, the first sealing portion 41 in the energy storage apparatus extends in the direction inclined with respect to the first surface to be contacted 221A of the inner spacer 2A and the first surface to be contacted 231B of the outer spacer 2B.

Accordingly, in the energy storage apparatus, the first sealing portion 41 is elastically deformed by being in contact with the first surface to be contacted 221A of the inner spacer 2A and the first surface to be contacted 231B of the outer spacer 2B.

As a result, it becomes difficult for the first sealing portion 41 to separate from the first surface to be contacted 221A of the inner spacer 2A and the first surface to be contacted 231B of the outer spacer 2B. Therefore, the energy storage apparatus can more securely block the fluid that tends to flow into between the holder 3 and the extending portion of the spacer 2.

Moreover, in the energy storage apparatus, the first sealing portion 41 is in contact with each of the extending portions 22A arranged as aligned to each other in the Z axis direction of the inner spacer 2A, and each of the extending portions 23B arranged as aligned to each other in the Z axis direction of the outer spacer 2B. Accordingly, the energy storage apparatus can block the fluid that tends to flow into between each of the extending portions 22A arranged as aligned to each other in the Z axis direction of the inner spacer 2A and the holder 3 and between each of the extending portions 23B arranged as aligned to each other in the Z axis direction of the outer spacer 2B and the holder 3, by the first sealing portion 41. That is, the energy storage apparatus can block the fluid that tends to flow into between the holder 3 and the extending portion of the spacer 2, at each of the opposite ends in the Z axis direction by the first sealing portion 41.

Then, in the energy storage apparatus, the first sealing portion 41 is formed in the projecting ridge that is in contact with each of the extending portion 22A of the inner spacer 2A and the extending portion 23B of the outer spacer 2B. Accordingly, the energy storage apparatus can block the flow of the cooling fluid that tends to flow into between the holder 3 and the extending portion of each of the plurality of spacers 2, by the first sealing portion 41.

Accordingly, the energy storage apparatus can lead the fluid that tends to flow into between the holder 3 and the extending portion of each of the plurality of spacers 2 to flow through the respective passages 23A and 24B.

Further, in the energy storage apparatus, the sealing portions 430 of each one of the pair of second sealing portions 43 are in contact with the connecting side 25B of the outer spacer 2B. Accordingly, the energy storage apparatus can block the fluid that tends to flow into between the connecting side 25B of the outer spacer 2B and the holder 3, by the second sealing portion 43.

In this manner, the energy storage apparatus can lead the fluid that tends to flow into between each of the extending portions 22A of the inner spacer 2A and the holder 3 and also the flow that tends to flow into between the connecting side 25B of the outer spacer 2B and the holder 3 to flow through the respective passages 23A and 24B.

Moreover, the first sealing portion 41 includes the sealing portion 410 being in contact with each of the first surface to be contacted 221A of the inner spacer 2A and the first surface to be contacted 231B of the outer spacer 2B, and the sealing portion 411 being in contact with each of the second surface to be contacted 222A of the inner spacer 2A and the second surface to be contacted 232B of the outer spacer 2B.

Accordingly, the cooling fluid that tends to flow into between the holder 3 and the extending portion of the spacer 2 can be blocked by the pair of sealing portions 410 and 411 of the first sealing portion 41. Accordingly, the energy storage apparatus can more securely block the fluid that tends to flow into between the holder 3 and the extending portion of the spacer 2.

As a matter of course, the energy storage apparatus according to an aspect of the present invention is not limited to the above-described embodiment, and various modifications can be made without departing from the gist of the present invention.

In the above-described embodiment, the base 20A of the inner spacer 2A has the substantially rectangular shape and also has substantially the same size as that of the first wall 100c of the energy storage device 1. However, so long as postures of the two adjacent energy storage devices 1 can be adapted to each other, the shape of the base 20A of the inner spacer 2A is not limited to the approximately rectangular shape, and the size of the base 20A of the inner spacer 2A is also not limited to substantially the same size as that of the first wall 100c of the energy storage device 1.

In the above-described embodiment, the base 20B of the outer spacer 2B has the substantially rectangular shape and substantially the same size as that of the first wall 100c of the energy storage device 1. However, so long as a posture of the adjacent energy storage device 1 and the end plate 30 can be adapted to each other, the shape of the base 20B is not limited to the approximately rectangular shape, and the size of the base 20B is also not limited to substantially the same size as that of the first wall 100c of the energy storage device 1.

In the above-described embodiment, the outer spacer 2B has the restricting portion 21B formed at each of the corner portion of the base 20B. However, so long as a position where the energy storage device 1 is arranged can determine with respect to the base 20B, the position where the restricting portion 21B is formed in the base 20B is not limited to the above-described position.

In the above-described embodiment, the first sealing portion 41 of the insulator 4 extends straight in the Y axis direction, and the surfaces to be contacted 221A and 222A of each of the plurality of extending portions 22A are formed so as to extend in the direction inclined with respect to the direction in which the first sealing portion 41 of the insulator 4 extends. However, the first sealing portion 41 and the surfaces to be contacted 221A and 222A are not limited to the above-described configuration. For example, the first sealing portion of the insulator 4 may extend in the direction inclined with respect to the second direction orthogonal to the first direction, and the surfaces to be contacted 221A and 222A of the extending portion 22A in each of the plurality of spacers 2 may be formed so as to extend in the Z axis direction.

In the above-described embodiment, the insulator 4 includes the first sealing portion 41 and the second sealing portion 43. However, the insulator 4 is not limited to the above-described configuration. For example, the insulator 4 may include only the first sealing portion 41 or may include only the second sealing portion 43.

In the above-described embodiment, in the insulator 4, each one sealing portion 410 of the pair of first sealing portions 41 and each one sealing portion 430 of the pair of second sealing portions 43 are enclosed by each one sealing portion 411 of the pair of first sealing portions 41 and each sealing portion 431 on one side of the pair of second sealing portions 43 respectively. However, the insulator 4 is not limited to the above-described configuration. For example, in the insulator 4, each of the pair of first sealing portions 41 may include only one sealing portion 410, and each of the pair of second sealing portions 43 may include only one sealing portion 430. Alternatively, in the insulator 4, each of the pair of first sealing portions 41 may include only the sealing portion 411 on the other side, and each of the pair of second sealing portions 43 may include only the sealing portion 431 on the other side.

In the above-described embodiment, each of the pair of outer spacers 2B includes the connecting side 25B. However, the pair of outer spacers 2B are not limited to the above-described configuration. For example, any one of the pair of outer spacers 2B may include the connecting side 25B. In this case, the insulator 4 may include the one second insulating portion 42 and the one second sealing portion 43.

Moreover, in the above-described embodiment, the insulator 4 includes the first insulating portion 40, the first sealing portion 41, the second insulating portion 42, and the second sealing portion 43. However, the insulator 4 is not limited to the above-described configuration. For example, the insulator 4 may include the second insulating portion 42 and the second sealing portion 43.

In the above-described embodiment, the sealing portion may be present in the extending portion of the spacer, or alternatively a sealing member may be present independently between the extending portion of the spacer and the first insulating portion of the insulator. Moreover, the insulator and the holder may be formed as an integral body.

In the above-described embodiment, the intake fan is used for leading the cooling fluid to flow into the passages 23A and 24B. However, the configuration is not limited to the use of the intake fan. For example, an exhaust fan may be used instead of the intake fan, and the cooling fluid may be led by a force for discharging the fluid to pass through the passages 23A and 24B.

In the case of using the exhaust fan, the fluid that does not contribute to the cooling of the energy storage device 1 (the fluid that does not pass through the passages 23A and 24B) may be generated through a gap between the holder 3 and the spacer 2. However, the fluid passing through the gap between the holder 3 and the spacer 2 can be suppressed by the first sealing portion 41 and the second sealing portion 43 of the insulator 4. Accordingly, loss of the cooling fluid flowing through the passages 23A and 24B can be suppressed.

What is claimed is:
1. An energy storage apparatus comprising:
  an energy storage device;
  a spacer arranged adjacently to the energy storage device in a first direction;
  a holder that holds the energy storage device and the spacer; and
  an insulator arranged between the spacer and the holder, wherein the spacer includes
  a base that forms a passage in a second direction orthogonal to the first direction between the base and the energy storage device adjacent in the first direction; and
  an extending portion extending from the base in the first direction, and
  the insulator includes
  a first insulating portion arranged between the extending portion of the spacer and the holder; and
  a first sealing portion being in contact with the extending portion.

2. The energy storage apparatus according to claim 1, wherein the extending portion includes a surface to be contacted that is in contact with the first sealing portion, and
  the first sealing portion extends from the first insulating portion in a direction inclined with respect to the surface to be contacted.

3. The energy storage apparatus according to claim 2, wherein the first sealing portion has elasticity and lower rigidity than that of the surface to be contacted.

4. The energy storage apparatus according to claim 2, wherein the first sealing portion of the insulator extends in the second direction and is in contact with the surface to be contacted, and
  the surface to be contacted is inclined with respect to a direction in which the first sealing portion extends.

5. The energy storage apparatus according to claim 1, wherein the extending portion extends from each of opposite ends in a third direction orthogonal to each of the first direction and the second direction of the base,
  the insulator includes a pair of the first sealing portions,
  the one of the first sealing portions is in contact with the extending portion formed on the one end in the third direction of the base, and
  the other first sealing portion is in contact with the extending portion formed on the other end in the third direction of the base.

6. The energy storage apparatus according to claim 2, wherein the first sealing portion of the insulator extends in a direction inclined with respect to the second direction and is in contact with the surface to be contacted, and
  the surface to be contacted extends in the first direction and in a third direction orthogonal to each of the first direction and the second direction.

7. The energy storage apparatus according to claim 1, comprising:
  a plurality of the energy storage devices arranged in a row in the first direction; and
  a plurality of the spacers arranged adjacently to the plurality of energy storage devices,
  wherein each of the plurality of spacers includes the base that forms a passage between the base and each energy storage device adjacent in the first direction; and
  the extending portion extending from the base in the first direction,
  and
  the first sealing portion is a projecting ridge that is in contact with the extending portion.

8. The energy storage apparatus according to claim 7, wherein among the plurality of spacers, the spacer arranged at an end portion in the first direction includes a connecting side that connects a pair of extending portions extending respectively from the opposite ends in a third direction orthogonal to each of the first direction and the second direction of the base, the insulator includes a second insulating portion arranged between the holder and the connecting side of the spacer arranged at the end portion; and a second sealing portion continuous with the second insulating portion and being in contact with the connecting side of the spacer arranged at the end portion, and the second sealing portion is continuous with the first sealing portion.

9. The energy storage apparatus according to claim 7, wherein the holder includes a frame having a long side in the first direction, the frame includes a connecting portion arranged adjacently to each of the extending portions of the plurality of spacers with the first sealing portion of the insulator interposed therebetween, and the connecting portion of the frame is bent so as to have a center portion in the first direction that projects toward the insulator.

10. The energy storage apparatus according to claim 1, wherein the extending portion includes a surface to be contacted that is in contact with the first sealing portion, the surface to be contacted of the extending portion includes a first surface to be contacted; and a second surface to be contacted arranged adjacently to the first surface to be contacted in a third direction orthogonal to each of the first direction and the second direction, and the first sealing portion includes a sealing portion being in contact with the first surface to be contacted; and a sealing portion being in contact with the second surface to be contacted.

11. The energy storage apparatus according to claim 10, wherein the first surface to be contacted is arranged at a position where the first surface to be contacted is closer to the passage than the second surface to be contacted, and the sealing portion being in contact with the first surface to be contacted has a larger projecting length than that of the sealing portion being in contact with the second surface to be contacted.

12. An energy storage apparatus comprising:

an energy storage device;

a spacer arranged adjacently to the energy storage device in a first direction;

a holder that holds the energy storage device and the spacer; and an insulator arranged between the spacer and the holder, wherein the spacer includes a base that forms a passage in a second direction orthogonal to the first direction between the base and the energy storage device adjacent in the first direction; and a pair of extending portions extending from the base in the first direction, and extending respectively from opposite ends in a third direction orthogonal to each of the first direction and the second direction; and a connecting side connecting the pair of extending portions, wherein the insulator includes an insulating portion arranged between the holder and the connecting side of the spacer; and a sealing portion being in contact with the connecting side.

13. An energy storage apparatus comprising:

an energy storage device;

a spacer arranged adjacently to the energy storage device in a first direction;

a holder that holds the energy storage device and the spacer; and an insulator arranged between the spacer and the holder, wherein the spacer includes a base that forms a passage in a second direction orthogonal to the first direction between the base and the energy storage device adjacent in the first direction; and an extending portion extending from the base in the first direction, and the insulator includes a first insulating portion arranged between the extending portion of the spacer and the holder, and the extending portion includes a sealing portion being in contact with the first insulating portion of the insulator.

* * * * *